US008840022B1

(12) United States Patent
Roger et al.

(10) Patent No.: US 8,840,022 B1
(45) Date of Patent: Sep. 23, 2014

(54) SYSTEM AND METHOD FOR DECODING MARKS ON A RESPONSE SHEET

(71) Applicant: Election Systems & Software, LLC, Omaha, NE (US)

(72) Inventors: Bruno Roger, Omaha, NE (US); Mike Dvorak, Plattsmouth, NE (US)

(73) Assignee: Election Systems & Software, LLC, Omaha, NE (US)

( * ) Notice: Subject to any disclaimer, the term of this patent is extended or adjusted under 35 U.S.C. 154(b) by 0 days.

(21) Appl. No.: 13/965,368

(22) Filed: Aug. 13, 2013

Related U.S. Application Data

(60) Provisional application No. 61/794,148, filed on Mar. 15, 2013.

(51) Int. Cl.
*G06K 17/00* (2006.01)
*G07C 13/02* (2006.01)

(52) U.S. Cl.
CPC .................................... *G07C 13/02* (2013.01)
USPC ............................... 235/386; 235/51; 705/12

(58) Field of Classification Search
CPC ..... G06Q 20/10; G06Q 20/12; G06Q 20/045; G06Q 20/0453; G06Q 50/26; G07C 13/00; G06F 3/03545; G06F 21/33; G06F 21/645; G06F 17/60; G06K 17/00
USPC .......................... 235/386, 375, 51; 705/12, 14
See application file for complete search history.

(56) References Cited

U.S. PATENT DOCUMENTS

| | | | |
|---|---|---|---|
| 4,300,123 | A | 11/1981 | McMillin et al. |
| 4,357,596 | A | 11/1982 | Feilchenfeld |
| 4,479,194 | A | 10/1984 | Fogg et al. |
| 4,485,298 | A | 11/1984 | Stephens et al. |
| 4,724,307 | A | 2/1988 | Dutton et al. |
| 5,073,700 | A | 12/1991 | D'Onofrio |
| 5,117,358 | A | 5/1992 | Winkler |
| 5,164,601 | A | 11/1992 | Nordstrom |
| 5,495,532 | A | 2/1996 | Kilian et al. |
| 5,635,726 | A | 6/1997 | Zavislan et al. |
| 5,649,026 | A | 7/1997 | Heins, III |
| 5,737,440 | A | 4/1998 | Kunkler |

(Continued)

FOREIGN PATENT DOCUMENTS

WO    WO/2004/068418    8/2004

OTHER PUBLICATIONS

Neumann, Peter, *Security Criteria for Electronic Voting*, presented at the 16th National Computer Secruity Conference, Baltimore, MD Sep. 20-23, 1993 (7 pages).

*Primary Examiner* — Edwyn Labaze
(74) *Attorney, Agent, or Firm* — Stinson Leonard Street LLP

(57) ABSTRACT

A ballot tabulation device includes a scanner operable to obtain an image of at least a portion of a paper ballot that includes a voter response area. A processor applies a virtual template to the image to identify a center point for the voter response area. The virtual template comprises a set of characteristic points positioned in predetermined locations in relation to the center point of the voter response area, wherein the characteristic points comprise points that are common to a plurality of sample ballot images. The processor also defines a response window that is centered on the center point of the voter response area, and analyzes the response window to determine if the voter response area is marked by a voter.

46 Claims, 27 Drawing Sheets

(56) References Cited

U.S. PATENT DOCUMENTS

| | | |
|---|---|---|
| 6,079,621 A | 6/2000 | Vardanyan et al. |
| 6,079,624 A | 6/2000 | Apperson et al. |
| 6,134,399 A | 10/2000 | Hino et al. |
| 6,176,429 B1 | 1/2001 | Reddersen et al. |
| 6,194,698 B1 | 2/2001 | Zavislan et al. |
| 6,505,778 B1 | 1/2003 | Reddersen et al. |
| 6,854,644 B1 | 2/2005 | Bolton et al. |
| 7,134,597 B1 | 11/2006 | Jones |
| 7,172,118 B2 | 2/2007 | Urken |
| 7,306,149 B2 | 12/2007 | DeBiase, Jr. |
| 7,314,171 B2 | 1/2008 | Cummings |
| 7,314,172 B2 | 1/2008 | Vanek et al. |
| 7,377,431 B2 | 5/2008 | Urken |
| 7,617,978 B1 | 11/2009 | Albrecht et al. |
| 7,789,306 B2 | 9/2010 | Bauchot et al. |
| 7,848,982 B2 | 12/2010 | Zhu |
| 8,066,184 B2 | 11/2011 | Chung et al. |
| 8,195,505 B2 | 6/2012 | Poulos et al. |
| 8,261,986 B2 | 9/2012 | Chung et al. |
| 8,381,977 B2 | 2/2013 | Bauchot et al. |
| 2002/0077885 A1 | 6/2002 | Karro et al. |
| 2003/0136836 A1 | 7/2003 | DeBiase |
| 2003/0233274 A1 | 12/2003 | Urken et al. |
| 2005/0056697 A1 | 3/2005 | Cummings |
| 2005/0061880 A1 | 3/2005 | Vanek et al. |
| 2005/0067493 A1 | 3/2005 | Urken |
| 2005/0247783 A1 | 11/2005 | Poulos et al. |
| 2006/0249579 A1 | 11/2006 | DeBiase, Jr. |
| 2007/0023515 A1 | 2/2007 | Urken |
| 2007/0192176 A1 | 8/2007 | Onischuk |
| 2007/0267492 A1* | 11/2007 | Maclaine Pont ............ 235/386 |
| 2008/0264701 A1* | 10/2008 | Radtke et al. ............. 178/19.01 |
| 2008/0272194 A1* | 11/2008 | Chaum ....................... 235/386 |
| 2009/0121018 A1 | 5/2009 | Bauchot et al. |
| 2009/0121019 A1 | 5/2009 | Bauchot et al. |
| 2009/0173778 A1 | 7/2009 | Cummings et al. |
| 2009/0289115 A1 | 11/2009 | Chung et al. |
| 2009/0308922 A1 | 12/2009 | Chaum |
| 2010/0241493 A1 | 9/2010 | Onischuk |
| 2010/0252628 A1* | 10/2010 | Chung ....................... 235/386 |
| 2011/0053559 A1 | 3/2011 | Klein |
| 2011/0139872 A1 | 6/2011 | Coutts |
| 2012/0145784 A1* | 6/2012 | Coomer et al. ............. 235/386 |
| 2012/0173307 A1* | 7/2012 | Moore et al. ................. 705/12 |
| 2012/0232963 A1 | 9/2012 | Poulos et al. |
| 2012/0259680 A1 | 10/2012 | Poulos et al. |
| 2012/0259681 A1 | 10/2012 | Poulos et al. |
| 2013/0085815 A1 | 4/2013 | Onischuk |
| 2013/0301873 A1 | 11/2013 | Hoover et al. |
| 2013/0306724 A1 | 11/2013 | Korb et al. |
| 2014/0025433 A1 | 1/2014 | Onischuk |

* cited by examiner

FIG. 24B

SYSTEM AND METHOD FOR DECODING MARKS ON A RESPONSE SHEET

CROSS-REFERENCE TO RELATED APPLICATIONS

This application is based on and claims priority to U.S. Provisional Application Ser. No. 61/794,148, filed on Mar. 15, 2013, which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to optical scanners and, more particularly, to a system and method for decoding marks on a response sheet.

2. Description of Related Art

Elections, academic tests, referendums, surveys, gambling schemes, and other endeavors require the accurate analysis of marks made on response sheets. Optical scanners are typically used for this task to increase speed and accuracy. Such scanners obtain am image of the response sheet and analyze predetermined response areas to determine if a user has selected or marked the response areas. However, the image of the response sheet may include some amount of skew and/or distortion, which may occur for a variety of reasons. For example, the image of a response sheet may be skewed if the response sheet does not move straight though the transport system of the optical scanner. This can occur, for example, in cases where the optical scanner is designed to accommodate a variance in the size of the response sheets. Distortion can be caused by misalignment of the image scanner, printing errors (e.g., a response sheet being printed too light, too dark, blurry, or smudged), and dirty or imprecise scanners. These inconsistencies in the images of the response sheets can cause the optical scanners to incorrectly locate and interpret the responses areas on the response sheet so as to record a response area as marked when it is blank/unmarked and vice versa.

BRIEF SUMMARY OF THE INVENTION

The present invention is directed to a system and method for decoding marks on a response sheet. In an exemplary embodiment, the system comprises a ballot tabulation device for analyzing one or more voter response areas on a paper ballot (e.g., a voter response area defined by the printed outline of an oval). The ballot tabulation device includes a scanner operable to obtain an image of at least a portion of the paper ballot. For each voter response area, a processor applies a virtual template to the image to identify a reference point (e.g., a center point) for the voter response area. The virtual template comprises a set of characteristic points positioned in predetermined locations in relation to the reference point of the voter response area that are common to a plurality of sample ballot images (e.g., images of ballots printed on different papers, printed by different printers, and scanned by different tabulation devices). The processor identifies the reference point for the voter response area by identifying an initial reference point that approximates the location of the reference point, and then determining the location of the reference point using the initial reference point and the virtual template. Preferably, the processor applies a virtual mask to the image to mask all points on or outside the printed outline of the voter response area—leaving only any markings made by a voter inside the printed outline. The processor then uses the reference point to define a response window that is analyzed to determine if the voter response area is marked by a voter.

BRIEF DESCRIPTION OF THE DRAWINGS

An exemplary embodiment of the present invention is described in detail below with reference to the attached drawing figures, wherein:

FIG. 24b shows a second example of a pixel selection pattern for score calculation;

DETAILED DESCRIPTION OF EXEMPLARY EMBODIMENT

The present invention is directed to a system and method for decoding marks on a paper ballot or other type of response sheet, i.e., determining whether each voter response area on the ballot has been marked. While the invention will be described in detail below with reference to an exemplary embodiment of a precinct-based ballot tabulation device, it should be understood that the invention is not limited to the specific configuration or methodology of this embodiment. For example, the invention may also be used in connection with high speed central ballot scanners and other types of optical scanners that are used to process other types of response sheets. In addition, although the exemplary embodiment is described as embodying several different inventive features, one skilled in the art will appreciate that any one of these features could be implemented without the others in accordance with the invention.

Exemplary Configuration of Ballot Tabulation Device

Figure 1:
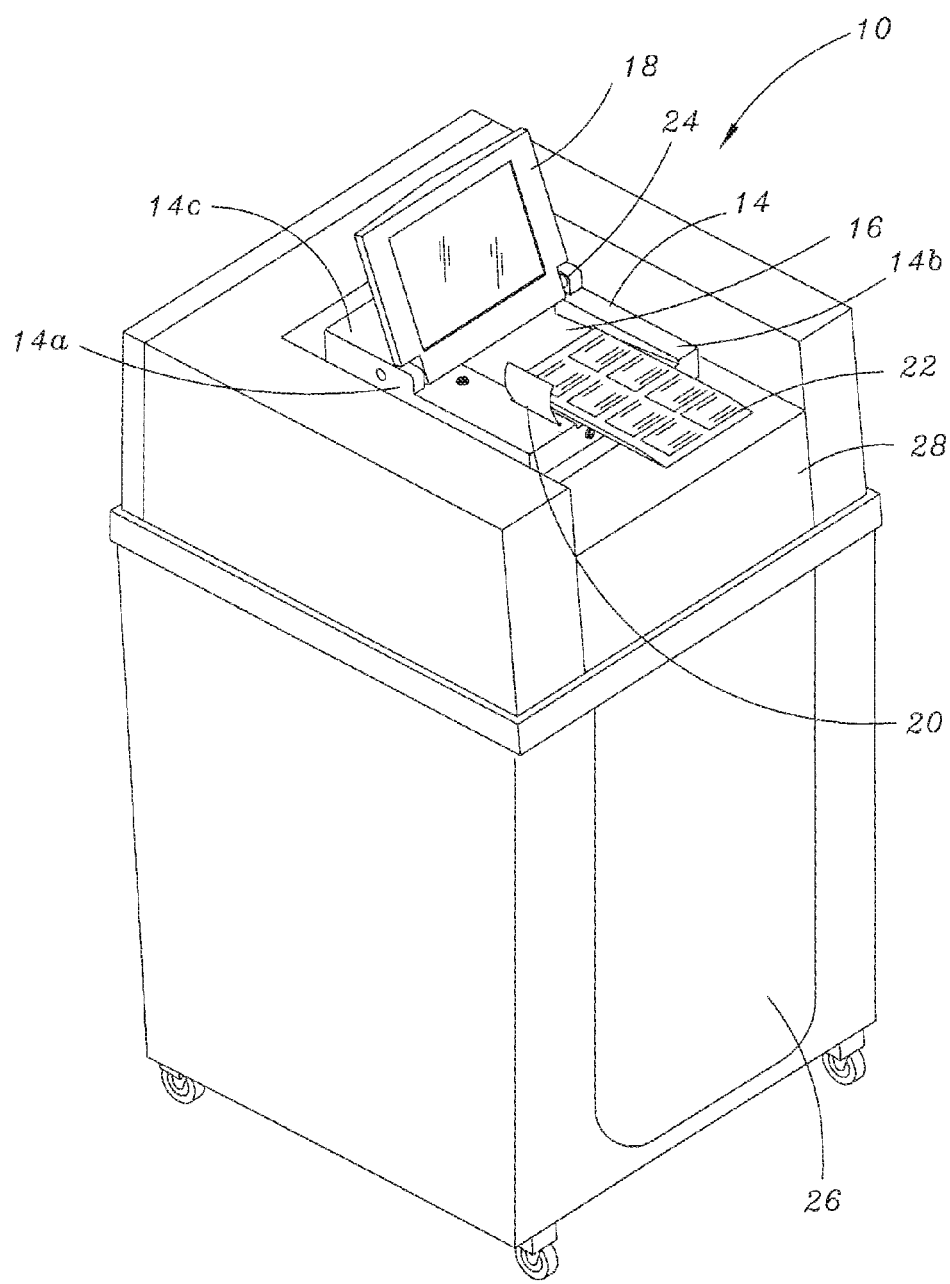
FIG. 1 is a perspective view of an exemplary embodiment of a ballot tabulation device in accordance with the present invention.

Referring to FIG. 1, an exemplary embodiment of a ballot tabulation device in accordance with the present invention is shown generally as reference numeral 10. Ballot tabulation device 10 generally includes a protective housing 14 with various internal components (as described in detail with reference to FIG. 2), a ballot insertion tray 16, a display 18 and a report printer 20. Each of these components will be described in detail below.

Protective housing 14 is preferably made of injection-molded plastic and has a modular "clamshell" design that provides easy access for maintenance and set up activities. Of course, other materials and designs are also within the scope of the present invention. Protective housing 14 preferably comprises three primary sections to assist in ease of manufacture and maintenance: base section 14a, front cover section 14b, and rear cover section 14c. In addition, various access doors (not shown) may be included to provide access to a variety of switches, connections and interfaces. For example, in the exemplary embodiment, a locked access door is provided to secure access to a power switch, a "close polls" switch, and a modem with an RJ-11 connection and antenna (discussed further in connection with the main access board 66 of FIG. 2). Another locked access door is provided to secure access to various USB port interfaces for removable USB flash drives (discussed further in connection with the USB board 64 of FIG. 2).

The back of protective housing 14 preferably includes a variety of external ports (not shown), such as a USB hub 70 (FIG. 2) and other types of ports that are standard and well known in the art. Of course, the external ports may be located in other locations provided they do not interfere with the use of the ballot tabulation device 10.

The ballot insertion tray 16 is provided to receive a paper ballot for scanning and tabulation. The ballot insertion tray 16 is preferably molded into the front cover section 14b of protective housing 14 and is approximately 8.525 inches wide in order to accommodate an 8.5 inch wide standard-size ballot, such as ballot 22 shown in FIG. 1. The ballot insertion tray 16 can, however, be designed to fit any size ballot. An additional tray insert (not shown) having reversible paper guides may be mounted into the ballot insertion tray 16. For example, when the paper guides are oriented down, the ballot insertion tray 16 may accommodate an 8.5 inch wide ballot. When the paper guides are oriented up, a 4.25 inch wide ballot may be supported. An arrow graphic is also preferably molded onto the ballot insertion tray 16 or additional tray insert to indicate the proper insertion of the ballot. Also, the ballot insertion tray 16 preferably has a ribbed texture to assist with reducing static buildup.

The display 18 is preferably an LCD touch screen display with a landscape orientation. The display 18 may be a standard, off-the-shelf component that is readily available and well known in the art. For example, the display 18 may be a standard size of 10.4 inches or 12.1 inches, measured diagonally, and approximately 82×82 dpi. Most preferably, the display 18 is an LG Philips 12.1" SVGA (800×600) TFT color display model LB121S03-TL01, which has a color depth of LVDS 6-bit, 262,144 colors and an anti-glare surface treatment. Of course, other types of touch screen displays may also be utilized in accordance with the present invention. The display 18 may be used to display information associated with a scanned paper ballot to the voter (e.g., information on ballot irregularities) and receive voter feedback, as described below.

The display 18 is connected to the upper portion of ballot tabulation device 10 by two hinges 24—one located on each side of the display 18—which enable the display 18 to open up during use or fold down flat during storage. For security and protection, the display 18 preferably incorporates a locking mechanism. The ballot tabulation device 10 may include an LCD switch 72 (FIG. 2) that will sense that the display 18 is open to thereby power up without requiring a polling official to physically turn on the display 18. Similarly, the LCD switch 72 will sense that the display 18 is closed to thereby power down after a specified period of time.

Alternatively, if the display 18 is not configured as a touch screen display, the ballot tabulation device 10 could also include another type of input device, such as a keypad, a joystick, a pointing device, a trackball, or a touch pad. The display 18 may also comprise a cathode ray tube (CRT) display configured as a touch screen display located external to the ballot tabulation device 10. In such a configuration, the display would be connected to the ballot tabulation device 10 through a dedicated I/O connector of the ballot tabulation device 10. Of course, other types of displays and input devices are also possible and within the scope of the present invention.

As shown in FIG. 1, ballot tabulation device 10 mounts onto the top of a ballot receptacle 26. The base of ballot tabulation device 10 includes four mounting feet (not shown) that provide airflow under the unit and allow it to be securely inserted into a recessed area of the ballot receptacle 26. In this embodiment, ballot tabulation device 10 slides onto mounting rails (not shown) located on top of the ballot receptacle 26. A hinged door (not shown) may be located on the front of the ballot receptacle 26 and may be raised up and locked into place to further secure the ballot tabulation device 10. The ballot receptacle 26 is preferably made of steel or a durable plastic material for security purposes. In operation, scanned and tabulated ballots are deposited directly into the ballot receptacle 26. In addition, the ballot receptacle 26 preferably includes a compartment 28 that polling officials can use to temporarily store uncounted ballots in the event of a power failure, scanner error, or the like. Of course, the ballot receptacle 26 may have other configurations that are well known to those skilled in the art.

Figure 2:
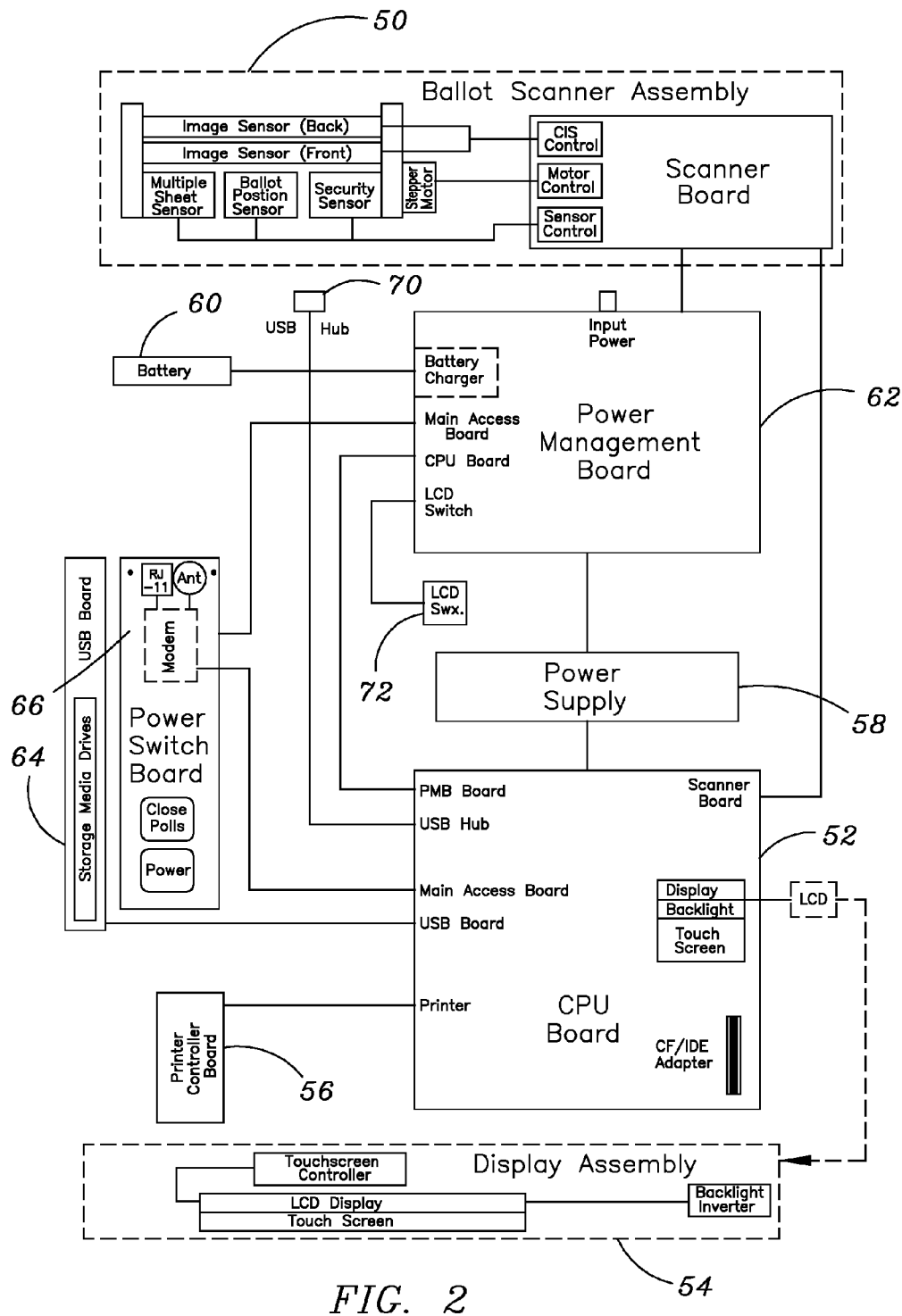
FIG. 2 is a block diagram of the various internal components of the ballot tabulation device of FIG. 1.

Turning to FIG. 2, the internal components of ballot tabulation device 10 are shown in a block diagram format and generally include: a ballot scanner assembly 50, a CPU board 52, a display assembly 54, a printer controller board 56, an internal power supply 58, an internal battery pack 60, a power management board 62, a USB board 64, a main access board 66, a USB hub 70, and an LCD switch 72 (discussed above). It should be understood that the various components and subsystems are connected to each other as shown in FIG. 2.

The ballot scanner assembly 50 includes a scanner board that provides the image capture, processing and transport control functions associated with scanning a paper ballot. The ballot scanner assembly 50 utilizes a set of sensors to monitor each paper ballot as it is placed in the ballot insertion tray 16 of ballot tabulation device 10 and travels through the ballot transport mechanism (not shown). These sensors detect the position of the ballot, check for multiple ballots and confirm the release of the ballot into the ballot receptacle 26. There may also be a security sensor that detects counterfeit ballots and ballots that have been tampered with. The ballot scanner assembly 50 utilizes two contact image sensors to produce a bitmap image of the paper ballot (preferably at 200 dpi or greater). One contact image sensor is positioned to read the top surface of the ballot and the other contact image sensor is positioned to read the bottom surface of the ballot. The imaging of the top and bottom surfaces of the ballot preferably occurs simultaneously. The paper ballot is pulled across the contact image sensors to capture the ballot image, and the ballot image is converted to a bi-tonal (i.e., black and white) image, as is known in the art. In this embodiment, the ballot scanner assembly 50 utilizes image capture technology available from Ricoh Electronics, Inc. The ballot image captured by the ballot scanner assembly 50 is passed to the CPU board 52, which decodes and tabulates the voting selections marked on the scanned ballot (described further below).

The CPU board 52 is a commercial off-the-shelf board that generally controls the operation of ballot tabulation device 10. The CPU board 52 is preferably capable of executing at least two independent processes concurrently. Accordingly, it is preferable to use an operating system that includes multi-tasking functionality, such as Linux and other operating systems known in the art. In this embodiment, the CPU board 52 is a VIA Embedded Platform EPIA-CL with a VIA C3™ or VIA Eden™ ESP processor. The CPU board 52 may include any type of memory that is suitable for storing information necessary for the operation of ballot tabulation device 10, as is well known in the art.

Many of the other internal components of ballot tabulation device 10 are also well known in the art. For example, the display assembly 54 includes an LCD display touch screen, a backlight inverter and a touch screen controller that provides an interface to display 18. The printer controller board 56 provides an interface to the report printer 20. In addition, the USB hub 70 provides a plurality of external USB ports that provide a connection for a variety of external devices.

The USB board 64 includes a plurality of external USB port interfaces that accommodate removable USB flash drives or any other type of removable data storage system. The removable USB flash drives may be used to store the election definition and the accumulated vote totals for ballot tabulation device 10. Also, the removable USB flash drives may be used to store the images of the scanned ballots, which may be accessed at a later time for audit purposes.

The main access board 66 includes a power switch and a "close polls" switch. The main access board 66 also includes a modem with an RJ-11 connector and antenna, which provide both landline and wireless modem options for transmitting vote results to a central vote accumulation site.

The ballot tabulation device 10 is powered by a power management subsystem that includes the power management board 62, an internal battery pack 60, and an internal ITX power supply 58. The power management board 62 is a custom power supply board which receives its input from an external brick power supply that operates on standard AC-volt lines. The internal battery pack 60 (preferably a re-chargeable Lithium-Ion type) provides up to two hours of operation during a loss of AC power. The internal ITX power supply 58 provides power to the CPU board 52, as is known in the art. The power management board 62 monitors the status of and charges the internal battery pack 60, and automatically switches from the external brick power supply to the internal battery pack 60 as needed.

Figure 3:
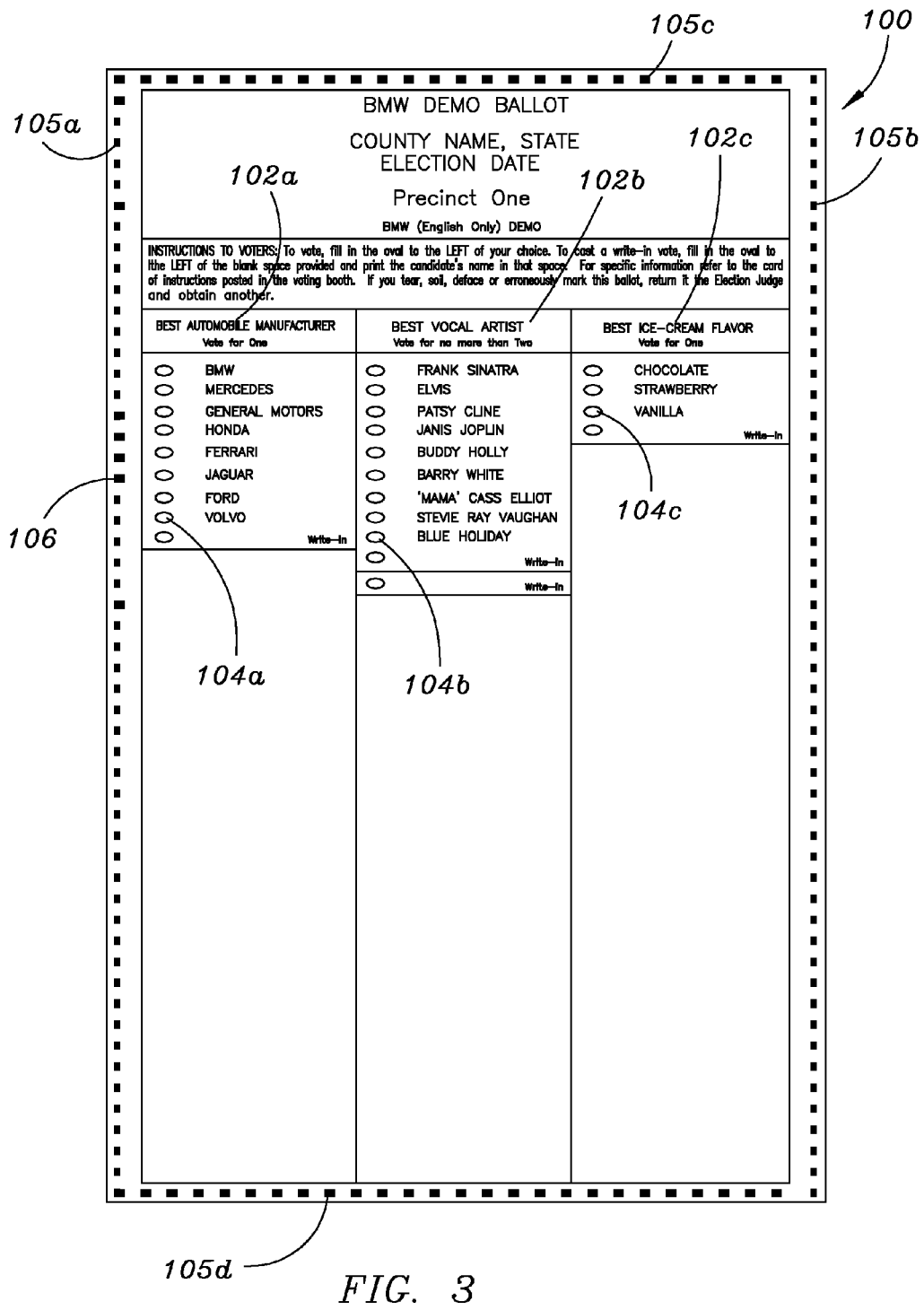
FIG. 3 is a plan view of an example paper ballot that may be scanned and processed by the ballot tabulation device of FIG. 1.

With reference to FIG. 3, an example paper ballot that may be scanned and processed by ballot tabulation device 10 is shown generally as reference numeral 100. Ballot 100 includes printed indicia (such as printed indicia 102*a-c*) that describe each contest (e.g., Best Automobile Manufacturer) and the names of the candidates associated with each contest (e.g., BMW, Mercedes, General Motors, Honda, Ferrari, Jaguar, Ford and Volvo). Ballot 100 also includes voter response areas (such as voter response areas 104*a-c*) corresponding to each of the candidates in each contest. As is known in the art, a voter may darken or otherwise mark the voter response area corresponding to his/her voting selection for each of the contests. Alternatively, a voter may utilize a ballot marking device to print a mark in each of the appropriate voter response areas, such as the AutoMARK® ballot marking device sold by Election Systems & Software, LLC.

Ballot 100 further includes a series of rectangular timing marks (such as timing marks 105*a-d*) positioned along and down the left and right sides and across the top and bottom of the ballot. Each of the timing marks on the left side of the ballot has a corresponding timing mark on the right side of the ballot, and each of the timing marks on the top of the ballot has a corresponding timing mark on the bottom of the ballot. The timing marks permit ballot tabulation device 10 to determine the position (i.e., row and column) of each of the voter response areas on the ballot.

Ballot 100 further includes a plurality of code channel marks (such as code channel mark 106) positioned adjacent to certain timing marks on the left side of the ballot. In this example, the code channel marks abut the timing marks such that the code channel marks essentially comprise expanded timing marks. Alternatively, the code channel marks may be located a distance from the timing marks such that the code channel marks and timing marks are separate marks. The code channel marks are used to identify the ballot style and precinct for ballot 100 so that ballot tabulation device 10 is able to associate the marked voting selections with the correct contests and candidates printed on the ballot (using the election definition data).

Exemplary Operation of Ballot Tabulation Device

An exemplary operation of the ballot tabulation device 10 will now be described. First, a polling official opens the poll by depressing the "power" switch located on the main access board 66 of ballot tabulation device 10 and transferring the election definition data to the ballot tabulation device 10. The transfer of the election definition data may be effectuated by a variety of different means. For example, a removable USB flash drive may be inserted into one of the USB ports of USB board 64. Of course, other means are also within the scope of the present invention.

Figure 4:
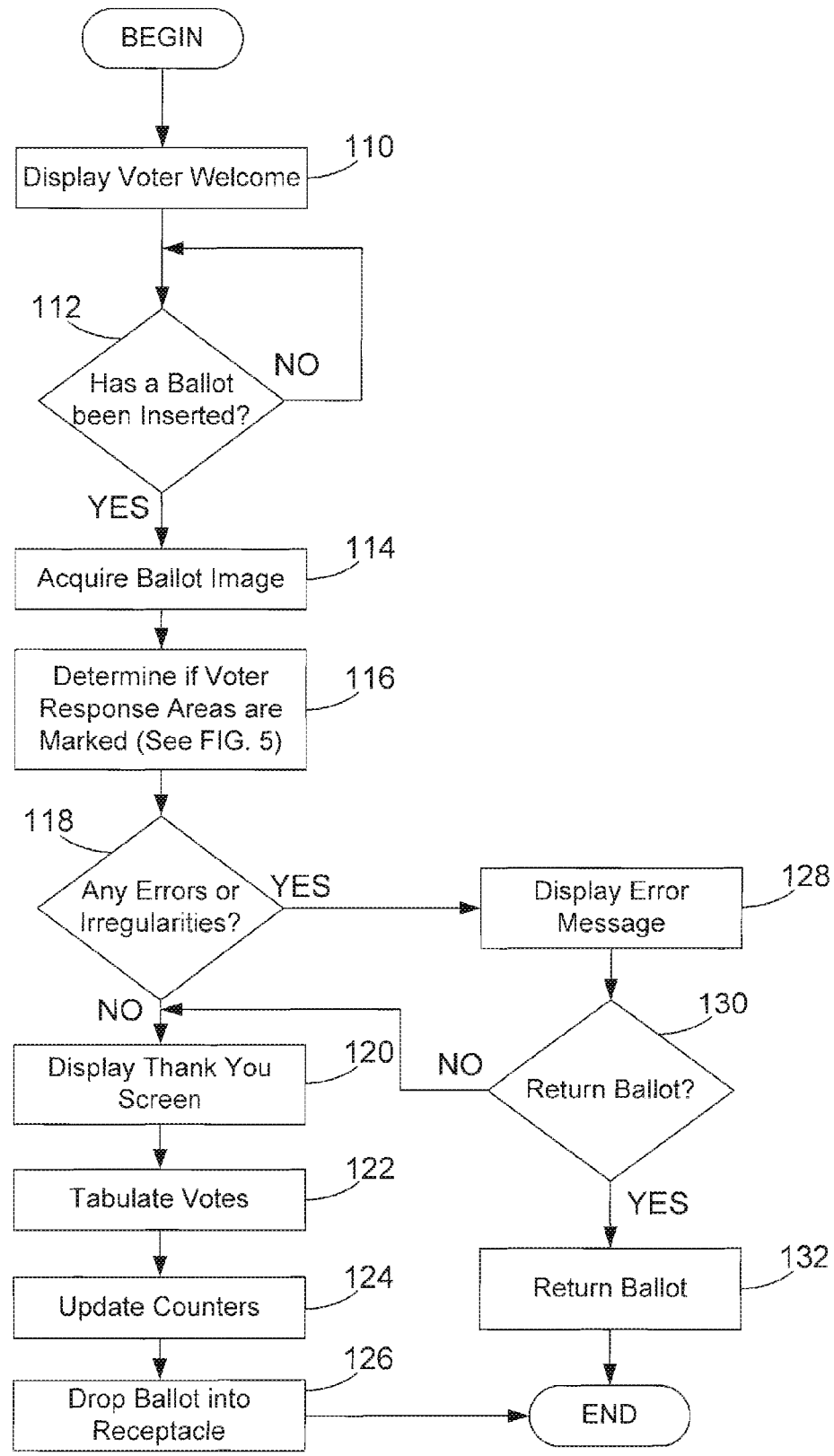
FIG. 4 is a process flow diagram of an exemplary operation of the ballot tabulation device of FIG. 1.

After transfer of the election definition data, ballot tabulation device 10 is ready to scan and tabulate paper ballots. An exemplary scanning/tabulation operation of the ballot tabulation device 10 is described with reference to blocks 110 to 132 of the process flow diagram shown in FIG. 4. At block 110, the ballot tabulation device 10 displays a "welcome" screen on display 18. The "welcome" screen displays a message (e.g., "Welcome. Please insert your ballot.") and a graphical depiction of the voting device demonstrating the proper insertion of the ballot into the ballot insertion tray (wherein the demonstration may be either static or moving). The "welcome" screen may also include a horizontally scrollable list of available languages at the bottom of the screen. The list of languages can be customized to include the most frequently used languages for a particular precinct location. Furthermore, the "welcome" screen may be set up to offer the most frequently used languages on the display, wherein other languages are available by scrolling through the list using the scroll bar.

At block 112, the ballot position sensors continuously monitor whether a paper ballot has been inserted into the ballot insertion tray 16 and, upon detection of a ballot, the ballot is fed into the ballot scanner assembly 50. Upon receiving a paper ballot, the ballot tabulation device 10 displays a "scanning ballot" screen on display 18, prompting the voter to wait until the voting selections marked on the ballot have been processed. At block 114, the ballot scanner assembly 50 scans the paper ballot so as to capture an image of the ballot. For double-sided ballots, both sides of the paper ballot are preferably scanned simultaneously so as to capture an image of each side of the ballot. The removable USB flash drives of USB board 64 may be used to store the images of the scanned ballots, which may be accessed at a later time for audit purposes. The removable USB flash drives may also be used to store the election definition and the accumulated vote totals for ballot tabulation device 10.

Figure 5:
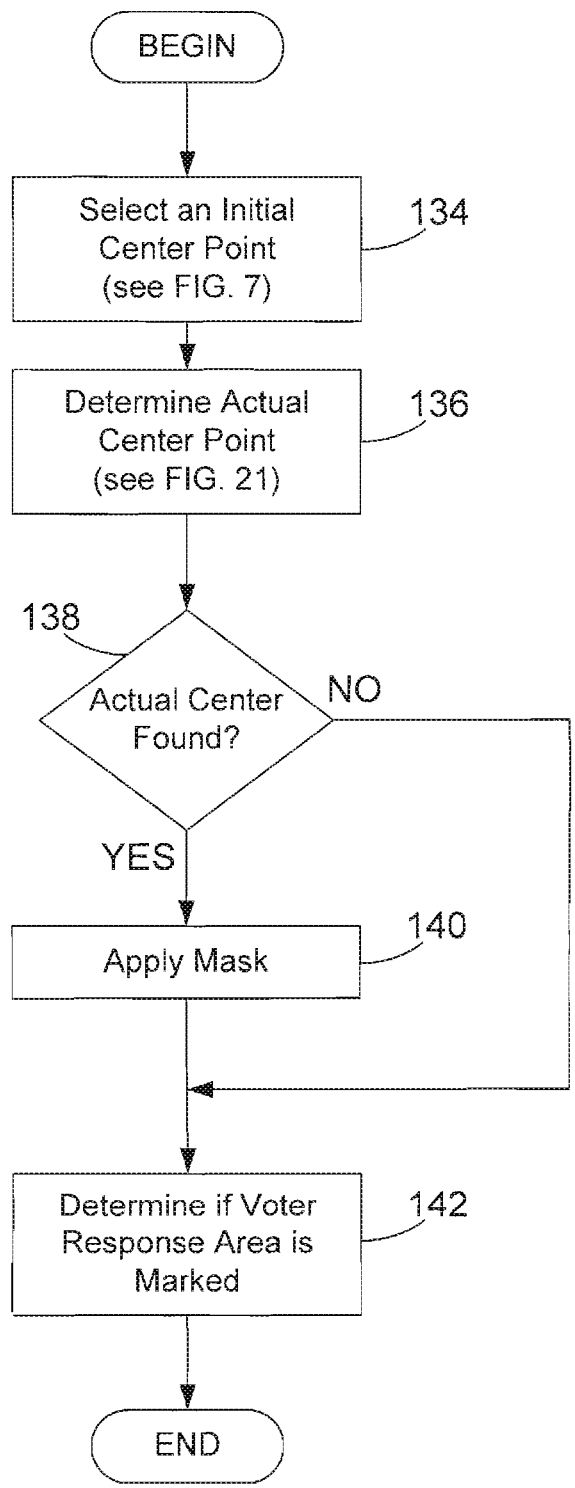
FIG. 5 is a process flow diagram of an exemplary method for determining if a voter response area is marked.

At block 116, the CPU board 52 analyzes the captured image of the ballot so as to decode the voting selections marked on the ballot (as shown in FIG. 5 and described below). As discussed above, the paper ballot includes code channel marks that allow the CPU board 52 to verify that the ballot is valid for a specific polling place, to select the proper ballot template (which is provided as part of the election definition loaded into the ballot tabulation device 10 via the removable USB flash drive at poll opening) for decoding the voting selections marked on the ballot, and to identify the orientation of the ballot.

At block 118, the ballot tabulation device 10 identifies any ballot irregularities or scanning errors associated with the paper ballot. Ballot irregularities relate to ballot images that can be properly analyzed, but contain irregularities associated with the manner in which the ballot was marked by the voter (e.g., under votes, over votes and blank ballots). Scanning errors relate to ballot images that cannot be properly analyzed because of an error in the scanning or processing of the image (e.g., timing track not extracted correctly, excessively skewed image, voter response areas cannot be determined, etc.). If one or more ballot irregularities or scanning errors are detected (block 118=YES), the ballot tabulation device 10 at block 128 displays an error message on display 18 identifying the nature of the identified ballot irregularities or scanning errors. The information in the error message includes, but is not limited to: (1) the disposition of the paper ballot; (2) a notification that one or more contests are not correctly voted; (3) a list of encountered error types; (4) the number of contests affected with each listed error type; (5) instructions on how to proceed; and (6) selection buttons such as "Don't Cast—Return Ballot," "Review Errors," and "Cast Ballot."

At block 130, a determination is made as to whether the paper ballot should be returned to the voter. It can be appreciated that this determination is made based upon voter input in response to the error message just described, or on the nature of the scanning error. If the ballot should be returned to the voter (block 130=YES), the ballot is returned to the voter at block 132, preferably by feeding the ballot in the opposite direction through the ballot insertion tray 16. At this point, the voter may either correct the error on the same paper ballot or obtain a new ballot from a poll worker (in cases where the problem is associated with one or more ballot irregularities), or simply feed the same paper ballot back into the tabulation device (in cases where the problem is associated with a scanning error).

If there are no ballot irregularities or scanning errors (block 118=NO) or the ballot should not be returned to the voter (block 130=NO), the ballot is cast, and at block 120 the tabulation device 10 displays a "thank you for voting" screen on the display 18 informing the voter that his/her voting selections have been tabulated. The "thank you for voting" screen displays a short message (e.g., "Thank you for voting. Your ballot has been counted."). Preferably, the message will be displayed for approximately 3 seconds or until the next ballot is inserted into the ballot insertion tray 16.

Next, at block 122, the votes are tabulated by the CPU board 52 and stored in one of the removable USB flash drives of USB board 64 (noting, of course, that any contest with irregularities may not be tabulated depending on jurisdictional rules). Then, at block 124, the vote counters are incremented by one to thereby provide confirmation that the ballot has been tabulated. At block 126, the ballot is dropped into the secure ballot receptacle 26 where it is retained for audit purposes, as is known in the art.

An exemplary method for determining if a voter response area is marked (see block 116 of FIG. 4) will be described with reference to blocks 134 to 142 of the process flow diagram shown in FIG. 5. Although the method will be described in connection with a single voter response area, one skilled in the art will appreciate that the same method can be applied to each voter response area on the ballot. Preferably, each voter response area is fully analyzed before analyzing a subsequent voter response area. Also, it can be appreciated that this method is performed by one or more processors of CPU board 52 shown in FIG. 2.

Figure 16:
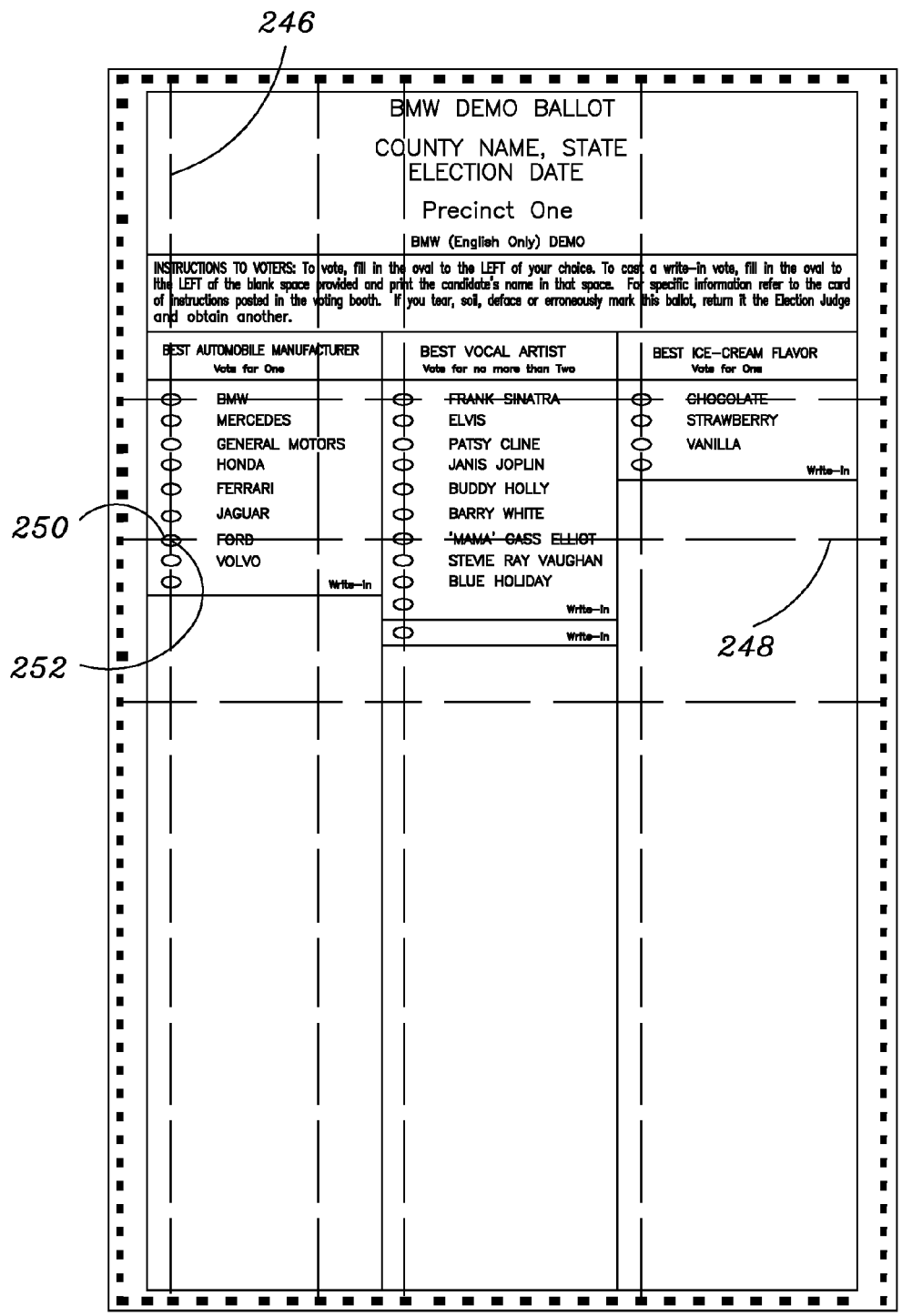
FIG. 16 shows the example ballot of FIG. 3 with virtual vertical and horizontal lines projected thereon.

At block 134, the processor identifies an initial center point that approximates the location of the actual center point of the voter response area. Preferably, the initial center point is identified by locating an intersection of a virtual horizontal line projected between the left and right timing marks associated with the voter response area and a virtual vertical line projected between the top and bottom timing marks associated with the voter response area, as shown in FIG. 16 and described below. The method for selecting the initial center point of the voter response area is described in greater detail below with reference to FIG. 7. Then, at block 136, the processor determines the actual center point of the voter response area, which is described in greater detail below with reference to FIG. 21.

It should be noted that although the exemplary embodiment uses the center point of the voter response area as the reference point, one skilled in the art will appreciate that other points corresponding to the voter response area could also be used as the reference point. Also, it should be understood that the terms "point" and "pixel" are used interchangeably when referring to the ballot image of the exemplary embodiment.

At block 138, the processor determines whether the actual center point of the voter response area was found. If the actual center point of the voter response area was not found (block 138=NO), then, at block 142, the processor determines if the full voter response area is marked (described below) without any masking being applied.

Figure 6:
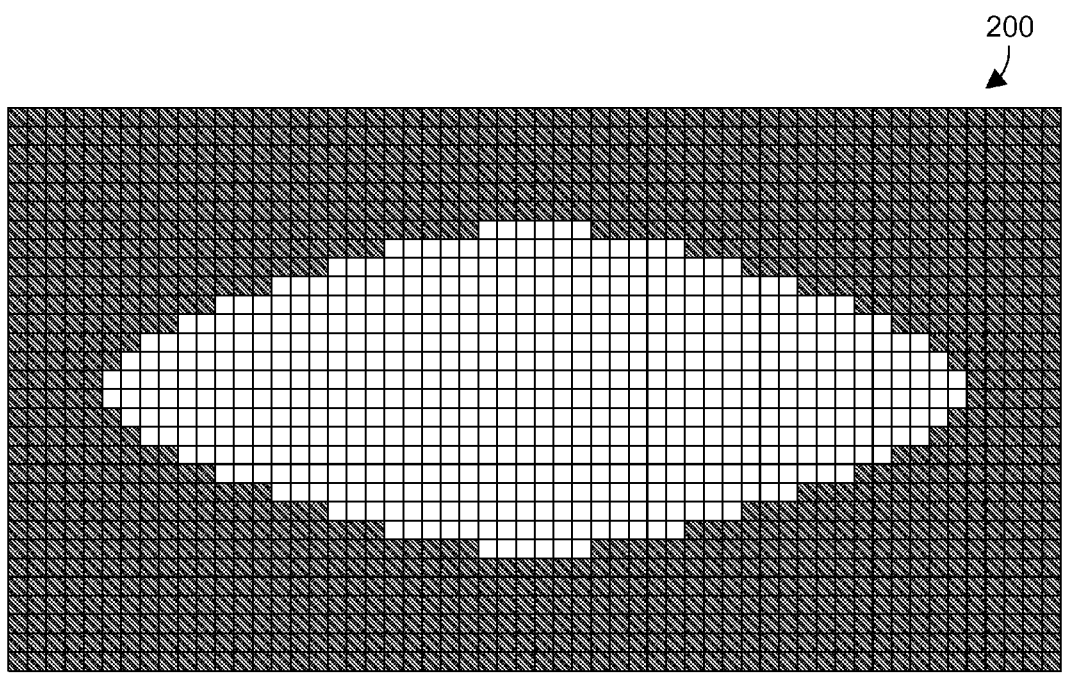
FIG. 6 shows an example reference shape mask.

If the actual center point of the voter response area was found (block 138=YES), then, at block 140, a virtual reference shape mask is applied to the voter response area to mask all points outside of the voter response area. Preferably, the reference shape mask also masks the printed outline that defines the outer boundary of the voter response area leaving only any markings made by a voter inside the printed outline. An example reference shape mask 200 for an oval shaped voter response area is shown in FIG. 6. After the reference shape mask is applied, at block 142, the processor determines if the voter response area is marked (described below).

The determination of whether the voter response area is marked (block 142) can be made in any manner known in the art. In one embodiment, the actual center point is used to define a rectangular response window around the voter response area. If the actual center point was not found, the response window may be defined based on the initial center point, which is the intersection of virtual lines connecting the timing tracks (as described in more detail below). For the oval voter response area of the exemplary embodiment, the response window is preferably 30 pixels high by 56 pixels wide. Of course, the response window can be any size or shape and may be calculated from any point as long as it includes the voter response area. The response window is then analyzed using a fast pixel count in combination with the intelligent mark recognition (IMR) technology described in U.S. Pat. No. 6,854,644, which is incorporated herein by reference in its entirety. The IMR technology is only used when the process cannot make a decision based on the pixel count value.

Specifically, the number of black pixels in the response window is compared to different thresholds to determine whether the voter response area has been marked. For example, if the number of black pixels is above an upper threshold, the voter response area is determined to be marked. If the number of black pixels is below a lower threshold, the voter response area is determined to be blank/unmarked. If the number of black pixels is between the lower and upper thresholds, the processor applies the IMR technology to determine whether the voter response area is marked, unmarked or contains a mark that is unreadable (i.e., a 3-state output).

In an alternative embodiment, only the thresholds described above are used to determine whether a voter response area is marked. For example, if the number of black pixels is above the upper threshold, the voter response area is determined to be marked. If the number of black pixels is below the lower threshold, the voter response area is determined to be blank/unmarked. If the number of black pixels is between the lower and upper thresholds, the marking in the voter response area is determined to be indeterminate and the ballot is returned to the voter. Of course, one skilled in the art will understand that there are other means for analyzing the voter response area in accordance with the present invention (e.g., comparing the pixel count to only a single threshold value).

Figure 7:
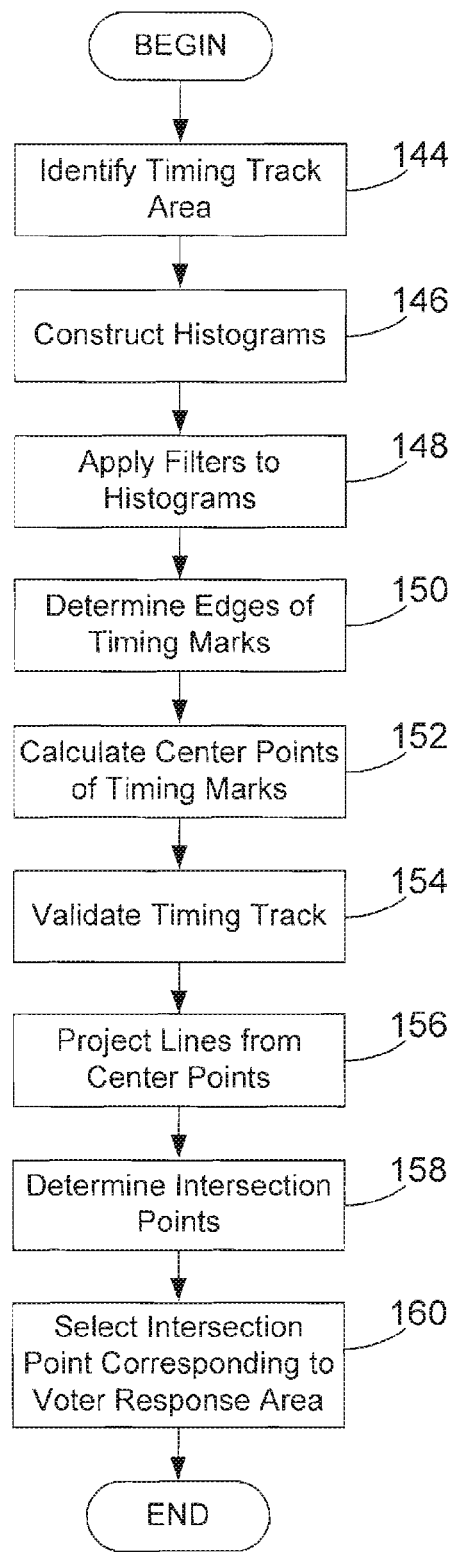
FIG. 7 is a process flow diagram of an exemplary method for selecting an initial center point of a voter response area.
Figure 8:
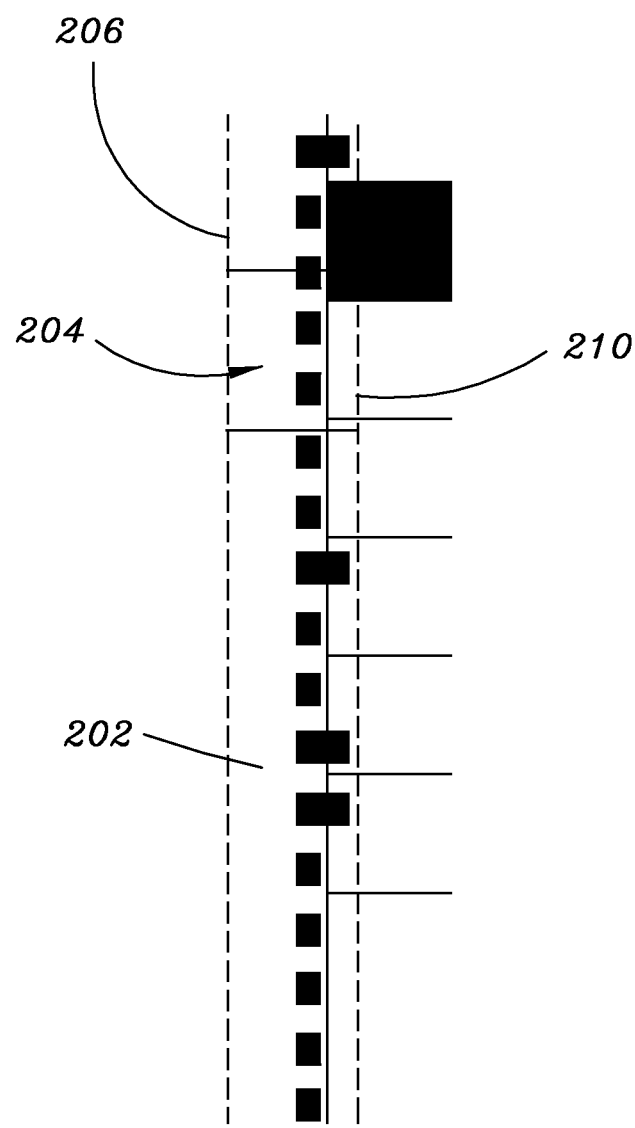
FIG. 8 shows an example timing track area of a paper ballot.

An exemplary method for selecting the initial center point (see block 134 in FIG. 5) will be described with reference to blocks 144 to 160 of the process flow diagram shown in FIG. 7. At block 144, the processor identifies the areas on the ballot image that may contain the timing marks. It can be appreciated that when a ballot is scanned, it can be in one of four orientations (face up/face down and head first/tail first). When the timing track areas are identified, the processor does not know the orientation of the ballot. As a result, the timing track areas preferably encompass all possible positions of the timing marks irrespective of ballot orientation or skew. Preferably, the processor identifies timing track areas on each side of the ballot image (i.e., top, bottom, left, and right) for each of the top and bottom faces of the ballot. An example timing track area 202 for the left side of the ballot image is shown in FIG. 8.

At block 146, a histogram is created for each identified timing track area. The histogram consists of a set of tuples that provide a starting point and a length for each line in the timing track area. The term "histogram line" as used herein refers to a row for the left and right timing track areas and a column for the top and bottom timing track areas. The starting point represents the (x,y) coordinate of the first black pixel in the histogram line, and the length is the number of black pixels in that histogram line. The histogram consists of the longest contiguous run of black pixels associated with the (x,y) coordinate of the start of the run for each histogram line.

Figure 9:
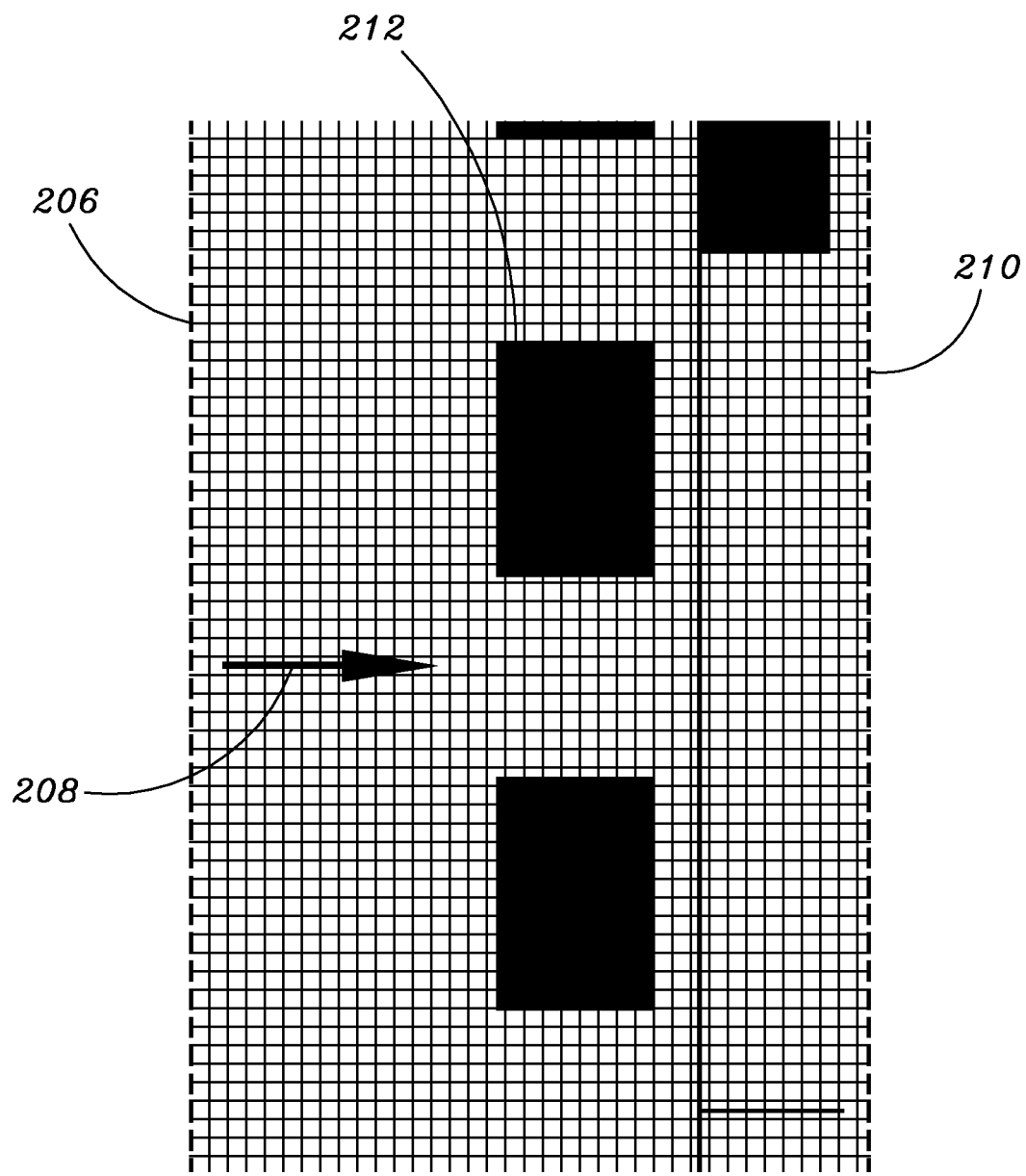
FIG. 9 shows a magnified view of a portion of the timing track area of FIG. 8.
Figure 10:
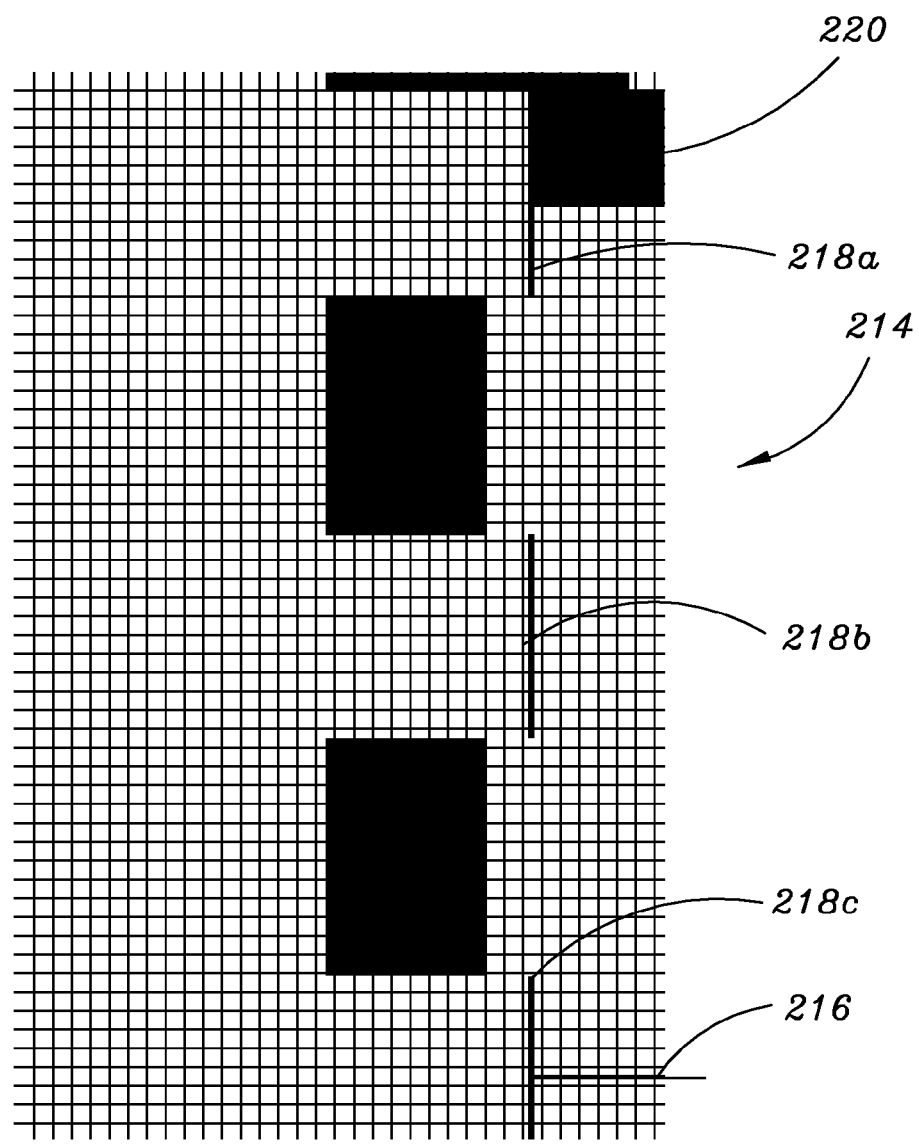
FIG. 10 shows an example histogram for the portion of FIG. 8.

To generate the histograms corresponding to the left and right timing track areas, the processor analyzes each row from the outside edge of the timing track area towards the inside edge of the timing track area and determines the (x,y) coordinate of the first black pixel relative to the longest contiguous number of black pixels in the row and counts the number of black pixels in that row. For example, FIG. 9 shows a magnified view of portion 204 of the timing track area 202 shown in FIG. 8. The histogram for portion 204 is created by starting each row at line 206 and scanning each pixel in the direction of arrow 208 toward line 210. The processor determines the (x,y) coordinate of the first black pixel relative to the longest contiguous number of black pixels in each row (e.g., pixel 212 in FIG. 9) and counts the highest contiguous number of black pixels in that row. An example histogram 214 for the timing track area portion 204 is shown in FIG. 10.

To generate the histograms corresponding to the top and bottom timing track areas, the processor scans each column from the outside edge of the timing track area towards the inside edge of the timing track area and determines the (x,y) coordinate of the first black pixel relative to the longest contiguous number of black pixels in the column and counts the highest contiguous number of black pixels in that column.

Of course, it should be understood that the processor performs a similar process to generate the histograms corresponding to all of the timing track areas on the ballot image.

After the histograms have been created, at block 148, the histograms are put through different filters so as to filter out marks in the timing track areas that do not correspond to timing marks. Preferably, each histogram is put through a narrow noise filter, a short noise filter, and a weighted filter, as discussed below.

Figure 11:
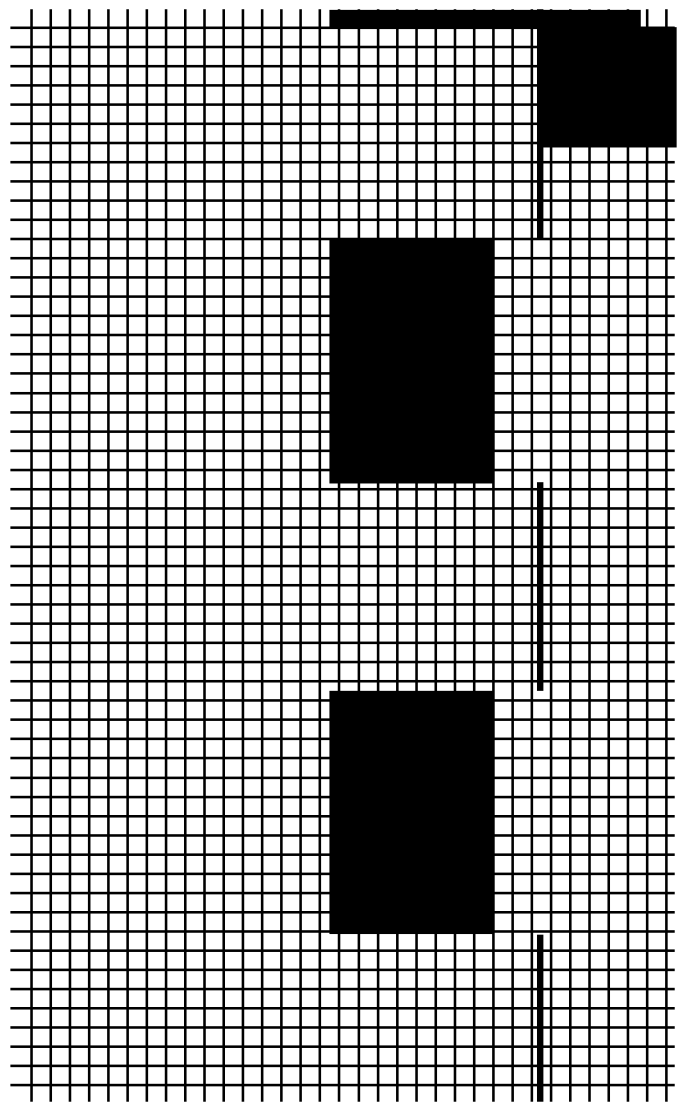
FIG. 11 shows the example histogram of FIG. 10 after a short filter is applied.

In the exemplary embodiment, the narrow noise filter is applied first. However, the narrow and short filters can easily be permuted. The narrow noise filter analyzes the width of each histogram line, and if the width is below a threshold, that histogram line is ignored. The width of a histogram line is the density of contiguous black pixels in the perpendicular axis from the direction that defines the histogram (arrow 208 in FIG. 9). For example, FIG. 11 shows example histogram 214 of FIG. 10 after application of the narrow noise filter. Note that mark 216 in FIG. 10 has been removed from the histogram in FIG. 11. Thus, the narrow noise filter filters out marks in the timing track area that are not wide enough to be a timing mark.

Figure 12:
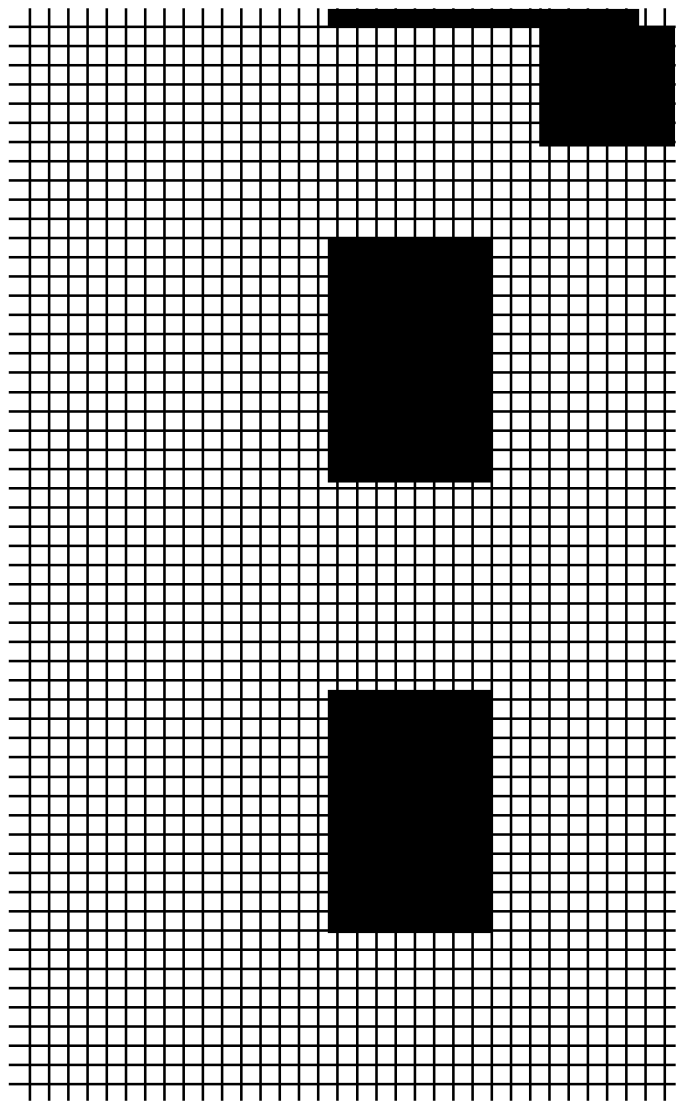
FIG. 12 shows the example histogram of FIG. 11 after a narrow filter is applied.

Next, the short noise filter is applied. The short noise filter analyzes the length of each histogram line that has not been previously filtered, and if the length is below a threshold, that histogram line is ignored. The length of a histogram line is the density of contiguous black pixels in the same axis as the direction that defines the histogram (arrow 208 in FIG. 9). For example, FIG. 12 shows example histogram 214 of FIG. 10 after application of the short noise filter. Note that marks 218a-c in FIG. 10 have been removed from the histogram in FIG. 12. Thus, the short noise filter filters out marks in the timing track area that are not long enough to be a timing mark.

Figure 13:
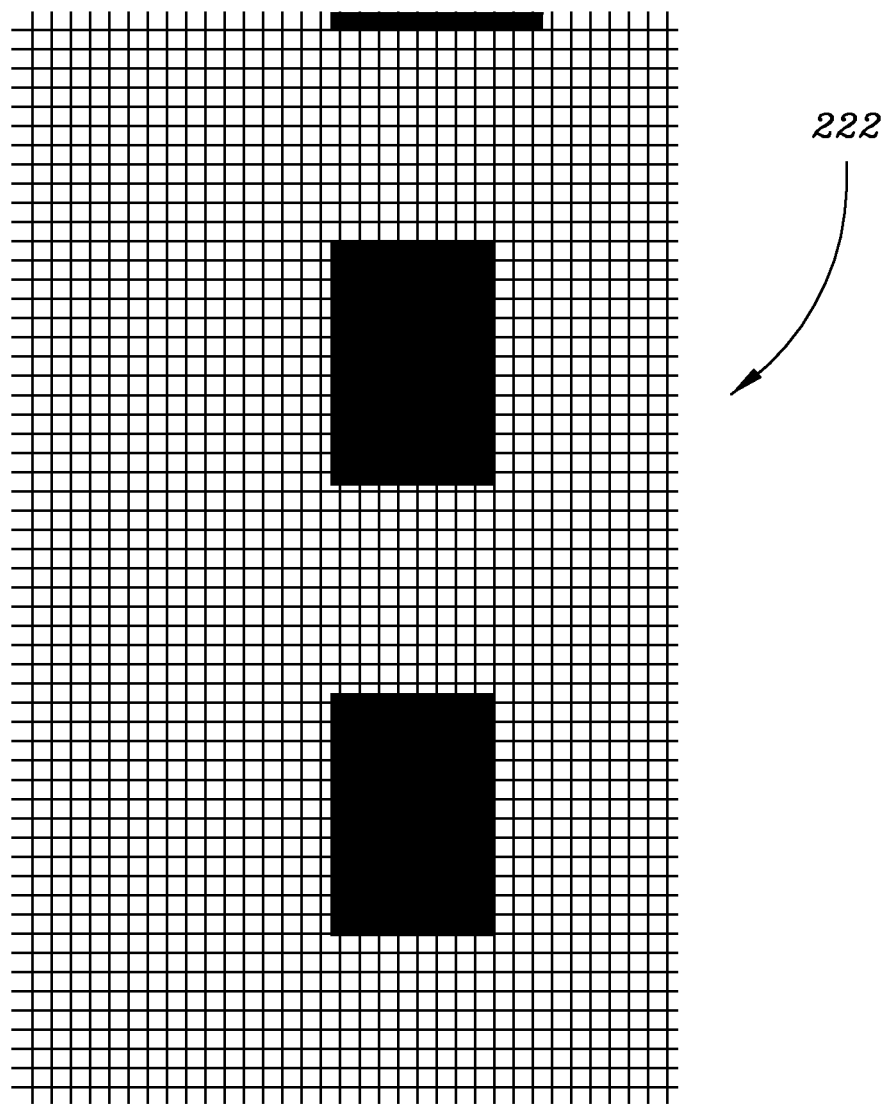
FIG. 13 shows the example histogram of FIG. 12 after a weighted filter is applied.

Finally, the weighted filter is applied. The weighted filter applies a statistical analysis to small sections of the timing track area so as to filter marks that are not consistent with other timing marks. In the exemplary embodiment, the weighted filter analyzes the starting point for each histogram line that has not been previously filtered and calculates an average starting point value (an (x) value for left and right timing track areas and a (y) value for top and bottom timing track areas). If the starting point for a histogram line is greater than a number of standard deviations from the average starting point value, preferably two standard deviations, that histogram line is ignored. For example, FIG. 13 shows example histogram 214 of FIG. 10 after application of the weighted filter. Note that mark 220 in FIG. 10 has been removed from the histogram in FIG. 13. Thus, the weighted filter filters out marks in the timing track area that are not consistent with the other timing marks, resulting in the final histogram 222 shown in FIG. 13.

In more detail, in the exemplary embodiment, the weighted filter assigns a weight to each histogram line. The two elements defining a run of pixels in a histogram line are referred to as the run position (or start position) and the run length. The weight represents the probability that the histogram line is part of a timing mark. The prediction value associated with the filtered section is the mean start value of the previous section. If the prediction value is valid, it sets a minimum position threshold and a maximum position threshold. If the starting point is not within these two limits, the weight associated with the histogram line is 0. This can be represented by the following condition:

If $(x_{n-1}-T \leq Rp_i \leq x_{n-1}+T)$=FALSE, $w_i$=0 where $x_{n-1}$ is the weighted mean value from section n−1 that is also the prediction value for the current section n T is the constant value representing the tolerance to the prediction value $Rp_i$ is the run position number i within the current section n $w_i$ is the weight associated to the run For example, if a previous filtered section provided a mean start value of 128 and the tolerance had a value of 16, the minimum threshold would be 112 and the maximum threshold would be 144. Thus, if the histogram line has a starting point that is less than 112 or greater than 144, that histogram line will be assigned a weight of 0. However, if the histogram line has a starting point within the minimum and maximum thresholds, the histogram line will be assigned a weight based on statistics. The weight by statistics is based on the knowledge of the width of the timing track. The algorithm associates a weight to each histogram line based on a static table that gathers probabilities that a histogram line with a certain length is part of a timing mark. This table contains three elements: a low threshold value, a high threshold value and a weight in percent. This can be represented by the following condition:

If $(TL_k \leq Rl_i \leq TH_k)$=TRUE, $w_i=W_k$ where $TL_k$ is the low threshold value of the static weight table indexed by k and associated with $W_k$ $TH_k$ is the high threshold value of the static weight table indexed by k and associated with $W_k$ $Rl_i$ is the run length number i within the section n $w_i$ is the weight associated with the run $W_k$ is the weight associated with the threshold values $TL_k$ and $TH_k$, k being the index of the weight element defined in the static weight table as shown in the example of Table 1.

For example, if the width of a timing mark is 16 pixels, the weight can be assigned as shown in Table 1 below (note that the ordering of the table is important and the highest probability is set at index k=0):

TABLE 1

| Weight | Lower Threshold | Upper Threshold |
| --- | --- | --- |
| 92% | 14 | 18 |
| 6% | 20 | 24 |
| 2% | 5 | 27 |
| 0% | Out of boundaries | Out of boundaries |

The weighted filter is then applied using the mean value and the standard deviation. Thus, even if a histogram line has a weight of 0, the histogram line may end up not being filtered. While assigning weight to each histogram line, the total weight assigned for all histogram lines is calculated by adding the new weight to the previous sum computed. Thus, the total weight can be represented by the following equation:

$$TW_n = \sum_{i=0}^{t-1} w_i$$

where $TW_n$ is the total weight for all histogram lines associated with the current section n $w_i$ is the weight of the current histogram line The weighted mean value for a section can then be calculated based on the following equation:

$$x_n = \frac{\sum_{i=0}^{t-1} w_i * Rp_i}{TW_n}$$

where $x_n$ is the weighted mean value for the current section $w_i$ is the weight associated to the current run $Rp_i$ is the run position number i within the section n $TW_n$ is the total weight for all histogram lines The standard deviation for the current section can be calculated based on the following equation:

$$\sigma_n = \sqrt{\frac{1}{TW_n} * \sum_{i=0}^{t-1} (R_{pi} - x_n)^2}$$

where
- $\sigma_n$ is the standard deviation for the current section
- $TW_n$ is the total weight for all histogram lines within the current section
- $x_n$ is the weighted mean value for the current section
- $Rp_i$ is the run position number i within the section n The computations described above are simplified to support integer numbers to allow for improved performance. After the weighted mean value and standard deviation are calculated as described above, the starting point value for each histogram line is analyzed, and each histogram line that has a starting point value that is not within a number of standard deviations from the weighted mean is filtered. This can be represented by the following condition.

If $x_n - S*\sigma_n \leq Rl_i \leq x_n + S*\sigma_n$ =TRUE, filter current line where
- $x_n$ is the weighted mean value for the current section
- S is the number of standard deviations allowed
- $\sigma_n$ the standard deviation for the current section
- $Rl_i$ is the run length number i within the section n Although three specific filters have been described above, one skilled in the art will appreciate that any number or type of filters may be applied to each histogram. In addition, the order of application of the filters may vary within the scope of the present invention.

Figure 14:
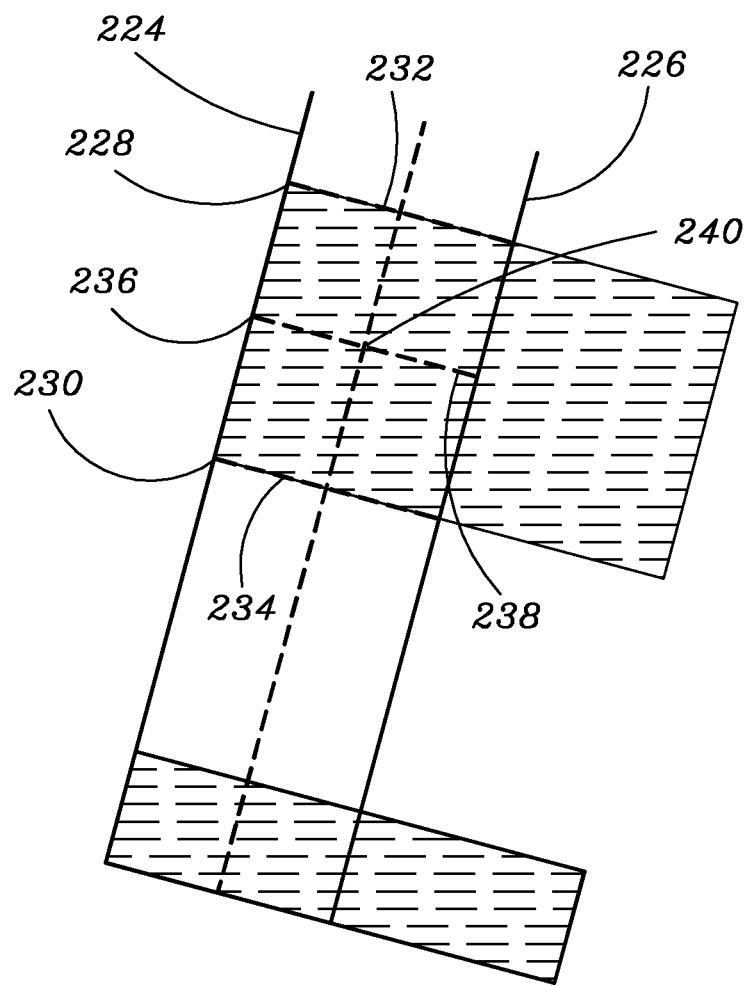
FIG. 14 shows an exemplary method for determining the edges of skewed timing marks.
Figure 15:
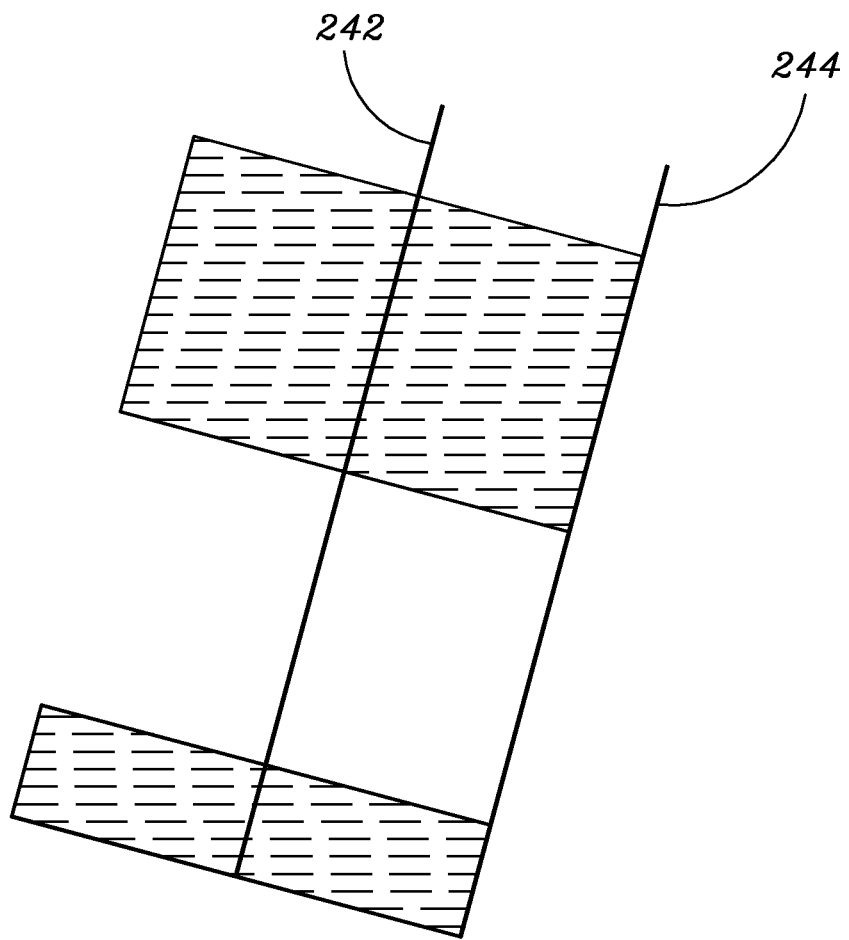
FIG. 15 shows an exemplary method for determining the edges of skewed code channel marks.

Turning again to FIG. 7, after the filters have been applied to the histograms, at block 150, the processor determines the edges of the timing marks within each timing track area using the remaining histogram lines (i.e., the histogram lines that have not been filtered). For example, for filtered histogram 222 shown in FIG. 13, it is easy to see the vertical line that could be drawn to represent the left outside edge of the timing marks. However, because many ballot images have at least a small amount of skew, the timing marks may not be square to the ballot image. As an example, FIG. 14 shows a sample set of timing marks (and code channel marks discussed in connection with FIG. 15 below) that are skewed. It should be noted that the timing marks and code channel marks shown in FIGS. 14 and 15 are indicated with hatch marks in order to illustrate various lines on the drawings, when in fact the timing marks and code channel marks will be black on the ballot image.

The present invention automatically compensates for skew in the ballot image by calculating a line that best fits the outside edge of the timing marks. To do so, the processor calculates a line that best fits the starting points for the non-ignored histogram lines of the corresponding histogram to identify an outside edge line for the timing marks on the ballot image. Preferably, this is accomplished by applying an ordinary least squares regression model on the filtered histograms. For example, FIG. 14 shows outside edge line 224 as the best fit line for the timing marks. After the outside edge line is calculated, an inside edge line is determined by calculating a line parallel to the outside edge line and at a distance equal to the width of the timing track (wherein the timing track width is preferably specified in the election definition). For example, FIG. 14 shows line 226 as being parallel to line 224 and at a distance that is the width of the timing track. The outside and inside edge lines compensate for skew in the ballot image because they are lines that best fit the timing marks on the ballot image.

As can be seen in FIG. 14, the inside and outside edges of the timing marks fall along the inside and outside edge lines 224 and 226, respectively. The remaining edges of the timing marks (i.e., the top and bottom edges for the left and right timing track areas or the left and right edges for the top and bottom timing track areas) are determined using the edge points on the outside edge line (e.g., points 228, 230 in FIG. 14). The remaining edges will fall along lines that are perpendicular to the outside edge line at the edge points. These perpendicular lines can be easily extracted by looking at the start positions corresponding to the runs of pixels that make a timing mark. The first start position and the last start position allows these two perpendicular lines to be drawn. For example, in FIG. 14, lines 232 and 234 are perpendicular to outside edge line 224 at points 228 and 230 and define the top and bottom edges of the timing mark.

Next, at block 152, the centers of the timing marks are calculated using the edges of the timing marks. For each timing mark, the center is determined by calculating a point on the outer edge line that is halfway between the outer edge points. In the exemplary embodiment, the halfway point is determined by moving along the outside edge line a distance of one half the distance between the outer edge points. For example, FIG. 14 shows halfway point 236 on outside edge line 224 halfway between edge points 228 and 230.

From the halfway point, the center of the timing mark is calculated by moving along a line perpendicular to the outer edge line a distance of one half the distance between the outer and inner edge lines (i.e., half the length of the timing track width defined in the election definition). For example, FIG. 14 shows a line 238 perpendicular to the outer edge line 224 at halfway point 236, and the center point 240 of the timing mark is located a distance of one half the width of the timing mark. Preferably, each timing mark is represented as a single (x,y) coordinate that corresponds to the center point of the timing mark, and the processor stores that coordinate for each timing mark.

After the centers points of the timing marks have been determined, at block 154, the processor validates the timing track to ensure that the timing track was properly extracted. Validation is performed by calculating the number of located timing marks (i.e., the number of stored (x,y) coordinates) and comparing the calculated number to the number of timing tracks identified in the election definition. If the calculated number and the number of timing marks identified in the election definition do not match, the timing track has not been extracted properly and the ballot will be rejected. In addition, the processor may also check for skew by evaluating the angle associated with the various lines and edges that were computed as described above. In an ideal image, all (x) coordinates of the center points of the left and right timing marks will have the same value and all (y) coordinates of the center points of the top and bottom timing marks will have the same value. If the difference in the (x) coordinates (or (y) coordinates) of the timing marks exceeds a threshold, the ballot will be rejected.

After the timing track has been validated, the code channel marks are extracted and analyzed in a manner similar to the timing marks described above. As seen in FIG. 15, the outside edge line 242 of the code channel mark is the same as the inside edge line of the timing mark (i.e., line 226 in FIG. 14). The inside edge line 244 of the code channel mark is determined by calculating a line parallel to the outside edge line 242 at a distance of the code channel width (which is preferably specified in the election definition). The center point of the code channel mark can then be calculated as described above in connection with the timing marks. In another embodiment, the code channel marks are separate from the timing marks. In this case, the election definition may define a code channel area (similar to the timing track area described above), and the code channel is extracted and the center points of the code channel marks are calculated in the same manner as the timing marks described above.

After the center points for the code channel marks have been determined, each code channel mark is associated with a corresponding timing mark to determine the raw code channel values. The presence or absence of a code channel mark is converted to a Boolean value array (i.e., if a code channel mark exists, the array has a value of 1 for that timing mark, and if a code channel mark does not exist, the array has a value of 0 for that timing mark). For example, the sample ballot portion in FIG. 8 has a Boolean array 10000001001100000. The Boolean array is validated by comparing the array against a set of valid Boolean arrays in the election definition. The Boolean array is used to verify that the ballot is valid for a specific polling place and to select the proper ballot template. If the Boolean array matches an array in the election definition, the ballot is valid and the corresponding ballot template is selected; otherwise, the ballot is rejected and returned to the user.

After the timing track and code channel have been validated, at block 156, the processor projects virtual lines between the center points of the timing marks. Virtual vertical lines are projected between the top timing marks and their corresponding bottom timing marks, and virtual horizontal lines are projected between the left timing marks and their corresponding right timing marks. For example, FIG. 16 shows example ballot 100 of FIG. 3 with a sampling of the projected virtual vertical and horizontal lines shown in phantom. In the exemplary embodiment, the processor projects virtual vertical and horizontal lines between every corresponding timing mark. In another embodiment, the processor only projects virtual vertical and horizontal lines between timing marks that correspond to a voter response area.

Figure 17:
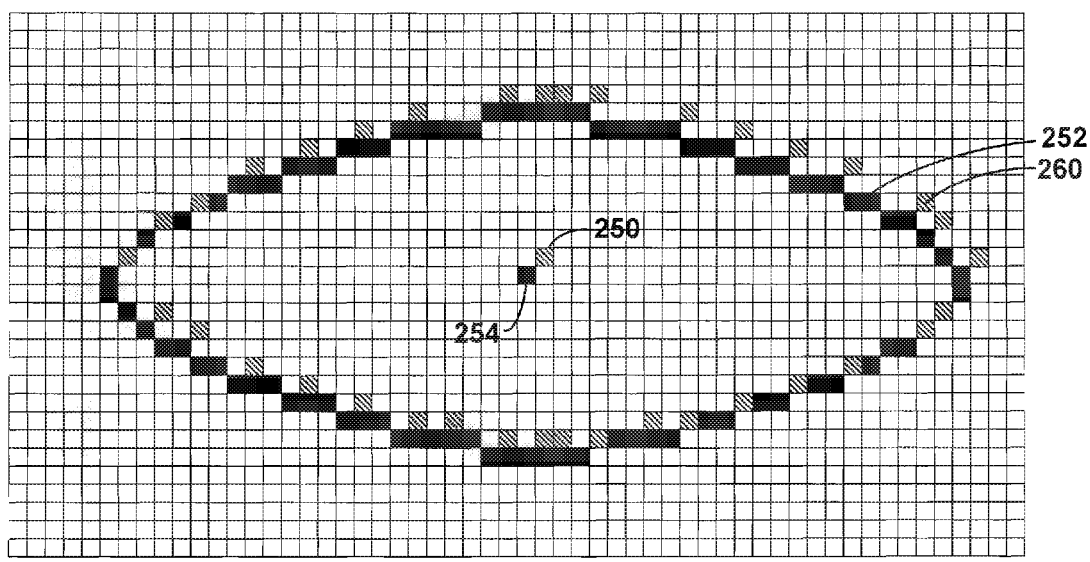
FIG. 17 shows a sample voter response area.

After the virtual vertical and horizontal lines have been projected onto the ballot image, at block 158, the processor determines where the virtual vertical and horizontal lines intersect. From these intersection points, the processor uses the election definition to determine which intersection points correspond to voter response areas. The intersection points of the virtual vertical and horizontal lines approximate the location of the center points of the voter response areas. Thus, at block 160, the processor assigns the intersection points corresponding to the voter response areas as the initial center points of the voter response areas. For example, FIG. 16 shows virtual vertical line 246 and virtual horizontal line 248 intersecting at point 250, which corresponds to voter response area 252. FIG. 17 shows voter response area 252 and initial center point 250. Although the initial center point is preferably determined as described above, one skilled in the art will appreciate that there are many ways to determine the initial center point of a voter response area, including selecting a predetermined (x,y) coordinate on the ballot image.

Although the center point of a voter response area is ideally located at the intersection point of the virtual vertical and horizontal lines, the intersection point may not be located at the actual center point of the voter response area for a variety of reasons. For example, differences between ballot printers used to print the ballots could cause this inconsistency in cases where the ballots are printed too light or too dark. Also, differences between the optical scanners used to image the ballots could cause this inconsistency in cases where a ballot image is blurry or smudged, the ballot is skewed or folded during scanning, or there are scanner shadows caused by dirty or imprecise scanners. Determining the actual center point of a voter response area is an important step that must be taken to properly decode the marks on the ballot. For example, as can be seen in FIG. 17, initial center point 250 is different than actual center point 254. Note that although the actual center point 254 of the voter response area is shown in FIG. 17, this point is included for explanatory purposes only—the processor does not yet know the actual center point.

In the exemplary embodiment, the actual center point of a voter response area is determined through the use of a virtual template. The virtual template comprises a set of characteristic points positioned in predetermined locations in relation to the center point of a voter response area. For example, the characteristic points could comprise all of the points along the outline of a voter response area. An example of such an outline is shown as reference numeral 256 in FIG. 18, which is centered about center point 258. However, one skilled in the art will appreciate that the use of every point along the outline 256 would be computationally intensive and may impact the performance of the tabulation device. Thus, in a preferred embodiment, the characteristic points comprise a subset of these points, as shown by points 260 in FIG. 19. The use of characteristic points 260 to define the virtual template will improve the processing efficiency of the tabulation device by reducing computational overhead when comparing the characteristic points to the ballot image, as described below. Note that because the algorithm uses a pre-defined template, it is possible to use any template such as a square, rectangle, circle or oval.

Figure 18:
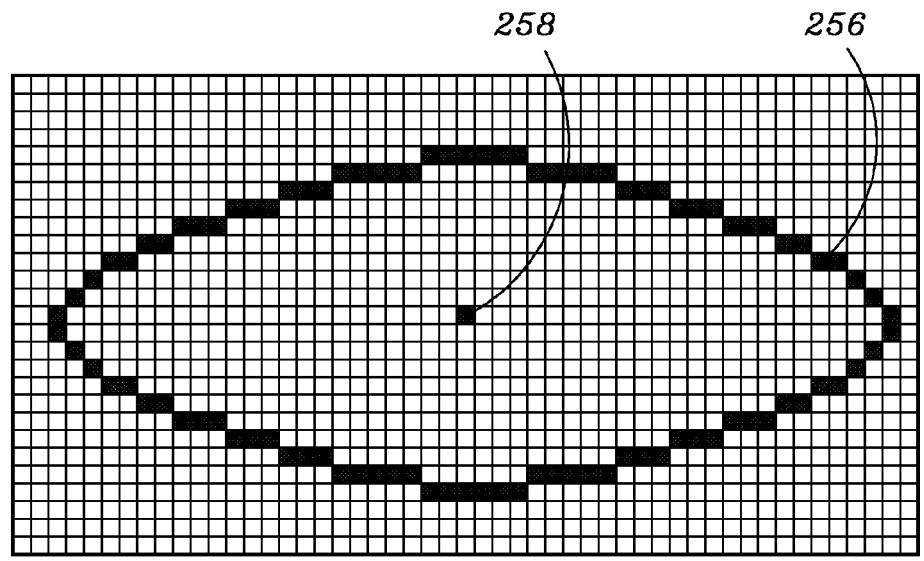
FIG. 18 shows a sample reference shape.
Figure 19:
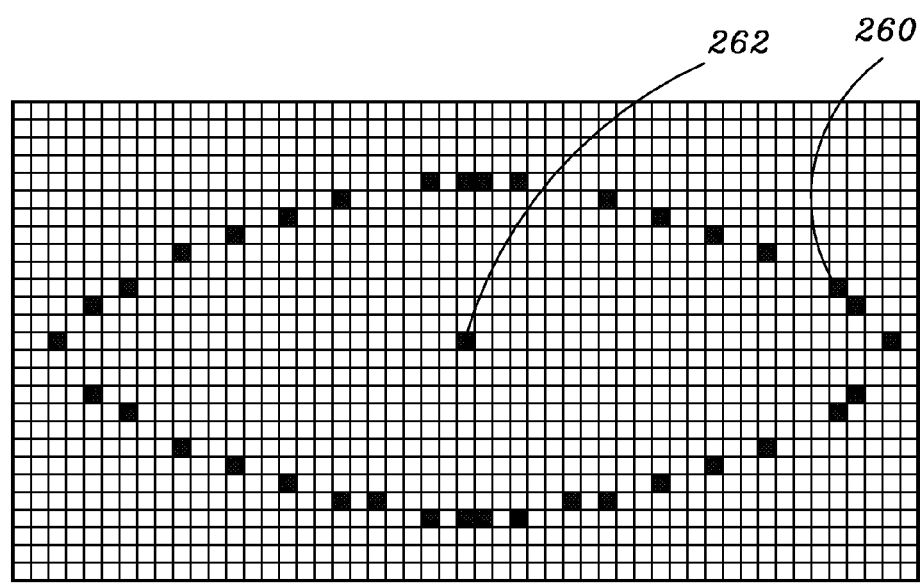
FIG. 19 shows a sample set of characteristic points.

For the oval reference shape, the number of characteristic points is in a range from about 14 characteristic points to about 60 characteristic points, and can be a default value or may vary depending on a dynamic calibration process (described below). For example, FIG. 19 shows 36 characteristic points positioned in predetermined locations in relation to center point 262. Note that the center point 258 of the outline shown in FIG. 18 is the same as the center point 262 of characteristic points 260 shown in FIG. 19. In this embodiment, characteristic points 260 are pixels that should be black. Alternatively, all or a portion of the characteristic points could comprise pixels that should be white, wherein it should be understood that any white characteristic points would be located outside the outline 256 shown in FIG. 18.

Figure 20:
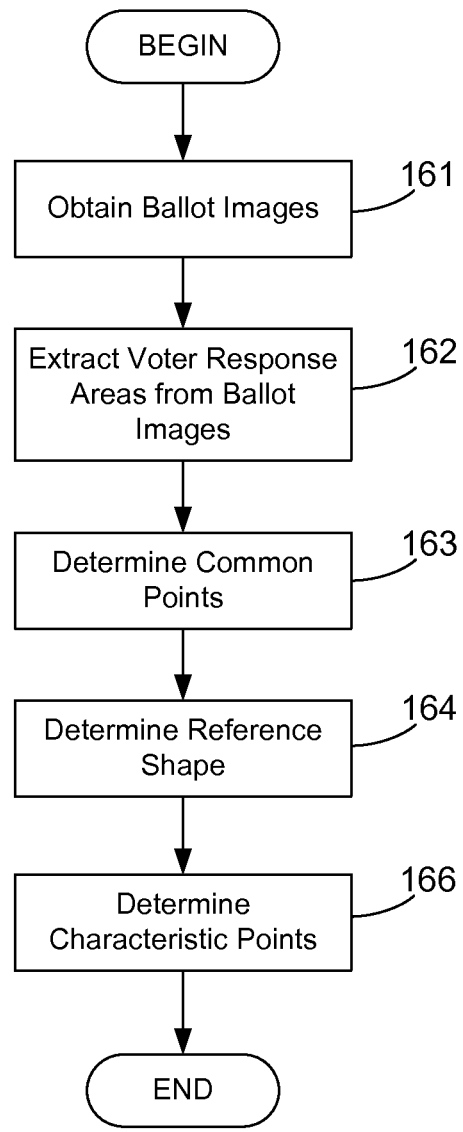
FIG. 20 is a process flow diagram of an exemplary method for determining a set of characteristic points for a voter response area.

An exemplary method for determining the characteristic points will be described with reference to blocks 161 to 166 of the process flow diagram shown in FIG. 20. The characteristic points are preferably determined prior to an election. At block 161, a plurality of ballot images with blank/unmarked voter response areas are obtained by printing a variety of paper ballots on a variety of different papers by a variety of different printers and then scanning such ballots on a variety of different optical scanners. The purpose of using different papers, printers and scanners is to obtain a large sample of images of blank/unmarked voter response areas to account for as many differences in the ballot image (i.e., how the scanner will actually "see" the voter response area) as possible.

At block 162, the voter response areas are extracted from the various ballot images. The same algorithm used in the tabulation device (described below in connection with FIG. 21) collects all the blank voter response areas and runs with a full virtual template. Thus, a powerful CPU is dedicated to the extraction and analysis of the sample images of the voter response areas. Despite the differences between the voter response areas extracted from the sample ballot images, there are points that will be common to a certain percentage of the sampled voter response areas. At block 163, statistical analysis is run on the images of the voter response areas to calculate a ratio for each point of a voter response area representing the number of images where the point was black (i.e., was located on the outline of the voter response area) to the total number of images. At block 164, the reference points that define the reference shape are defined as the set of points having a ratio greater than a reference point threshold. For example, the reference point threshold may be about 50%. At block 166, the characteristic points are defined as the set of points having a ratio greater than a characteristic point threshold. For example, the characteristic point threshold may be from about 75% to about 95%, more preferably from about 80% to about 90%, and most preferably about 85%. The list of characteristic points with their corresponding ratios and the number of characteristic points needed to accurately represent the outline of the voter response area are stored in the election definition. Of course, the characteristic points do not have to be calculated or determined as described above. One skilled in the art will appreciate that other methods for determining the characteristic points are possible and within the scope of the present invention. However, it should be understood that the method described above allows testing the same algorithm that is embedded in the tabulation device.

Figure 21:
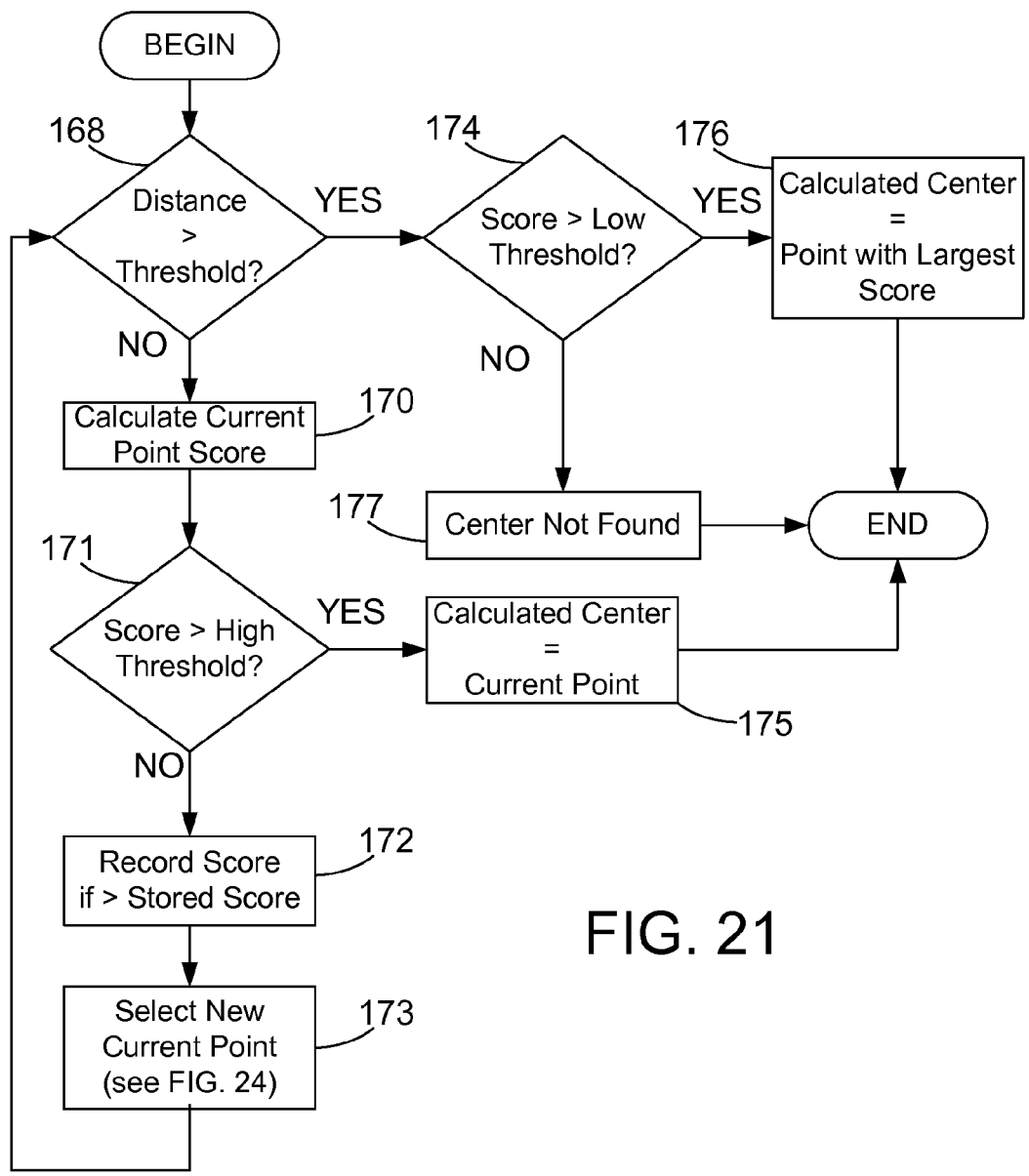
FIG. 21 is a process flow diagram of an exemplary method for determining an actual center point of the voter response area.
Figure 22:
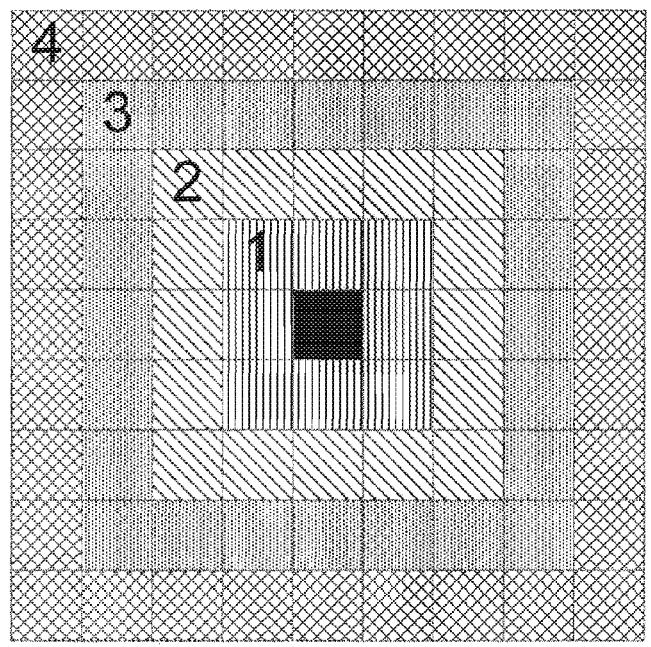
FIG. 22 shows a first example of pixel levels.

An exemplary method for determining the actual center point of the voter response area (see block 136 in FIG. 5) will be described with reference to blocks 168 to 177 of the process flow diagram shown in FIG. 21. For the first iteration, the initial center point is deemed to be the current center point (i.e., the point to be evaluated), such as initial center point 250 shown in FIG. 17, and characteristic points 260 are centered about initial center point 250. At block 168, the distance between the current center point and the initial center point is determined, such as by identifying the pixel level of the current center point. As shown in FIG. 22, the pixel level represents a concentric square "ring" around the initial center point 250, i.e., each pixel adjacent to the initial center point is level 1, each adjacent pixel outside of level 1 is level 2, each adjacent pixel outside of level 2 is level 3, and each adjacent pixel outside of level 3 is level 4. In this embodiment, a score for each pixel/center point is calculated (as described below) until the current pixel/center point is located in a level that exceeds a predetermined threshold (e.g., levels greater than pixel level 4). Alternatively, the actual distance between the current center point and the initial center point could be calculated using simple distance calculation, in which case the threshold would be a numerical distance value. Of course, it is preferred that the algorithm takes into consideration that the initial center point (calculated as described above) is close in distance to the actual center point of the voter response area.

If the distance is not greater than the threshold (block 168=NO), the score for the current center point (i.e., the initial center point 250) is calculated at block 170. In this case, the distance is 0 because the current center point is the initial center point 250. The score is determined by overlaying the characteristic points on the image in a position determined by the current center point and calculating a score corresponding to the number of characteristic points that match corresponding points on the image. For each characteristic point that matches the image (i.e., for each white characteristic point that is white and each black characteristic point that is black), the score associated with the current center point is incremented. As shown in FIG. 17, comparing characteristic points 260 to voter response area 252 shows that the current center point (i.e., initial center point 250) has a score of 10.

Figure 23:
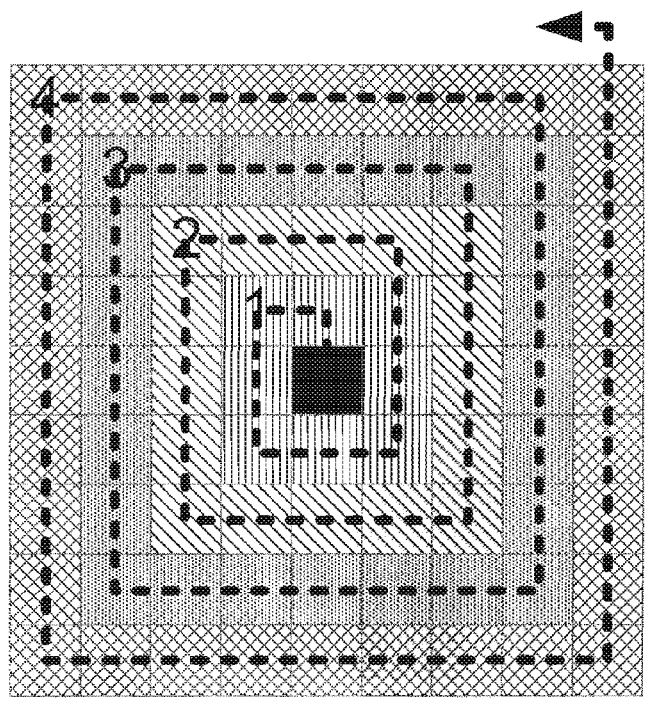
FIG. 23 shows a first example of a pixel selection pattern for score calculation.

After the score for the current center point is calculated, the score is compared to an upper center threshold at block 171. The upper center threshold will depend on how dark the voter response area is printed, and preferably is in the range from about 60% to about 95% of the number of characteristic points, and more preferably about 75% to about 85% of the number of characteristic points. If the score for the current center point is less than the upper center threshold (block 171=NO), then the score for the current center point may be stored and associated with the current center point at block 172. Preferably, the score for the current center point is stored only if that score is higher than the previously stored score (albeit all of the scores could be stored if desired). A new point is then selected as the current center point at block 173. For the example shown in FIG. 17, the upper center threshold is 30 pixels (85% of 36 pixels); thus, because the score is less than the upper center threshold (10<30), the score for the initial center point is stored and a new point is selected. In the exemplary embodiment, the new point is selected by following a spiral square pattern as shown in FIG. 23. Thus, the new point will be the pixel directly above initial center point 250.

Blocks 168 to 173 described above are repeated for different points until either the score of the current center point is above the upper center threshold (block 171=YES) or until the distance between the current center point and the initial center point is greater than the distance threshold (block 168=YES). For the example herein, FIGS. 25-27 show the characteristic points 260 positioned in relation to subsequent current center points, as described below.

Figure 25:
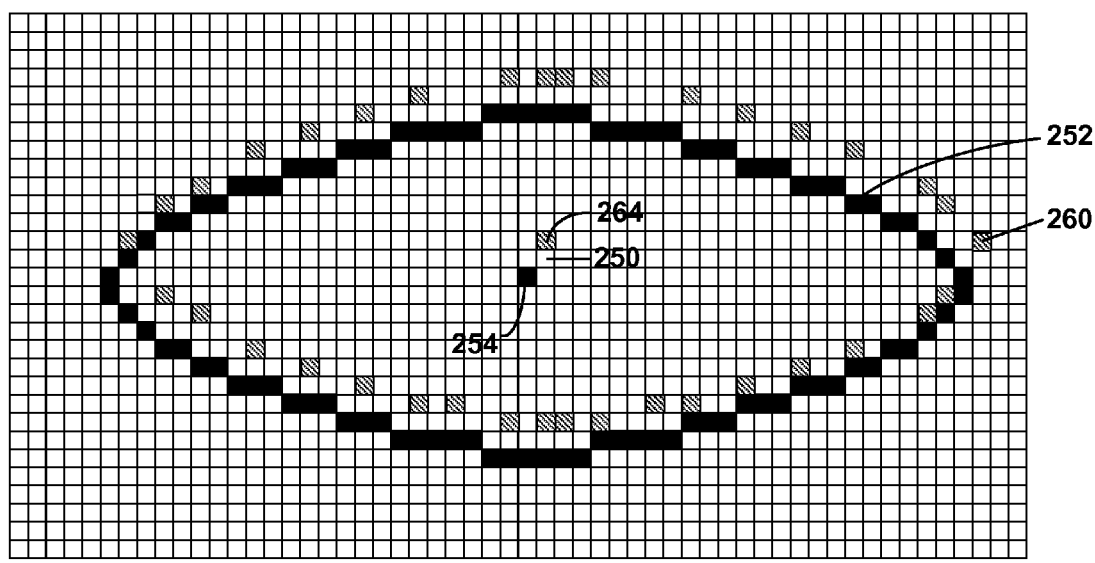
FIG. 25 shows the sample voter response area of FIG. 17 with the characteristic points of FIG. 19 centered about a second reference point.

FIG. 25 shows characteristic points 260 centered about the second current center point 264. As shown in FIG. 25, the score for the second current center point 264 is 0. Because the score for the second current center point is less than the upper center threshold (0<30; block 171=NO in FIG. 21), the process advances to block 172. In block 172, the score for the second current center point 264 is not recorded because the score of 0 is less than the stored score of 10 associated with the initial center point 250, and a new point is selected. Following the spiral square pattern shown in FIG. 23, the new current center point (i.e., the third current center point) is the point to the left of the second current center point and is shown as point 266 in FIG. 26.

Figure 26:
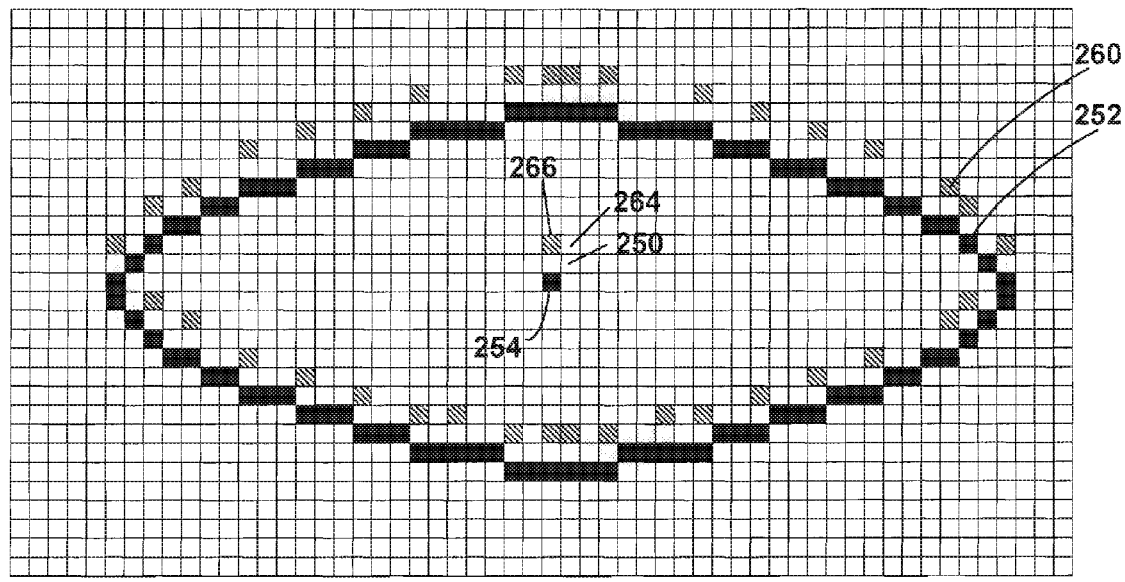
FIG. 26 shows the sample voter response area of FIG. 17 with the characteristic points of FIG. 19 centered about a third reference point.

FIG. 26 shows characteristic points 260 centered about the third current center point 266. As shown in FIG. 26, the score for the third current center point 266 is 0. Because the score for the third current center point 266 is less than the upper center threshold (0<32; block 171=NO in FIG. 21), the process advances to block 172. In block 172, the score for the third current center point 266 is not recorded because the score of 0 is less than the stored score of 10 associated with the initial center point 250, and a new point is selected. Following the spiral square pattern shown in FIG. 23, the new current center point (i.e., the fourth current center point) is the point below the third current center point and is shown as point 268 in FIG. 27.

Figure 27:
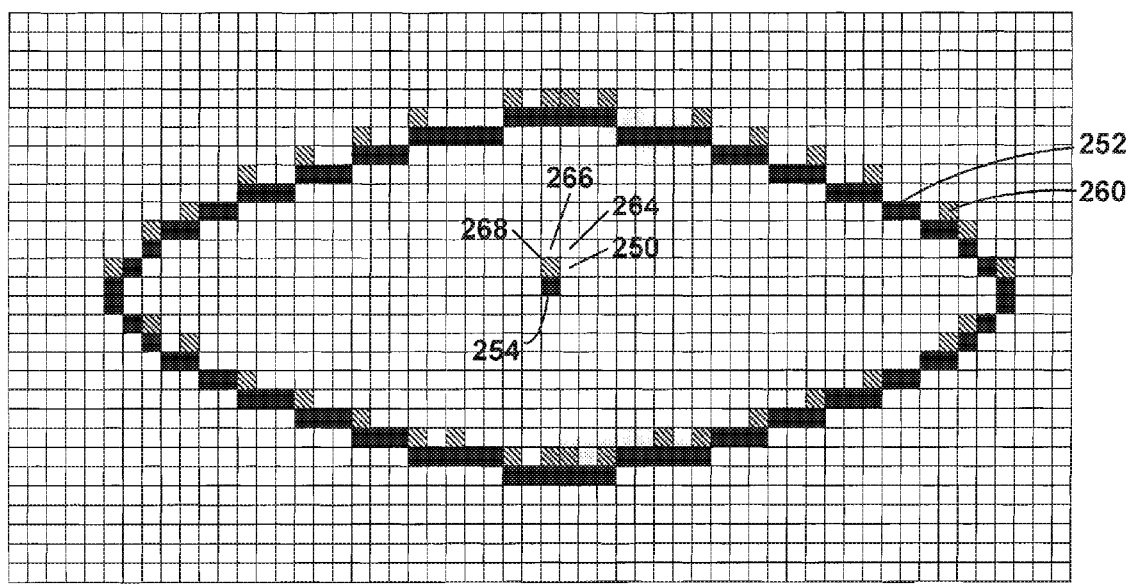
FIG. 27 shows the sample voter response area of FIG. 17 with the characteristic points of FIG. 19 centered about a fourth reference point.

FIG. 27 shows characteristic points 260 centered about the fourth current center point 268. As shown in FIG. 27, the score for the fourth current center point 268 is 0. Because the score for the fourth current center point 268 is less than the upper center threshold (0<32; block 171=NO in FIG. 21), the process advances to block 172. In block 172, the score for the fourth current center point 268 is not recorded because the score of 0 is less than the stored score of 10 associated with the initial center point 250, and a new point is selected. Following the spiral square pattern shown in FIG. 23, the new current center point (i.e., the fifth current center point) is the point below the fourth current center point and is shown as point 270 in FIG. 28.

Figure 28:
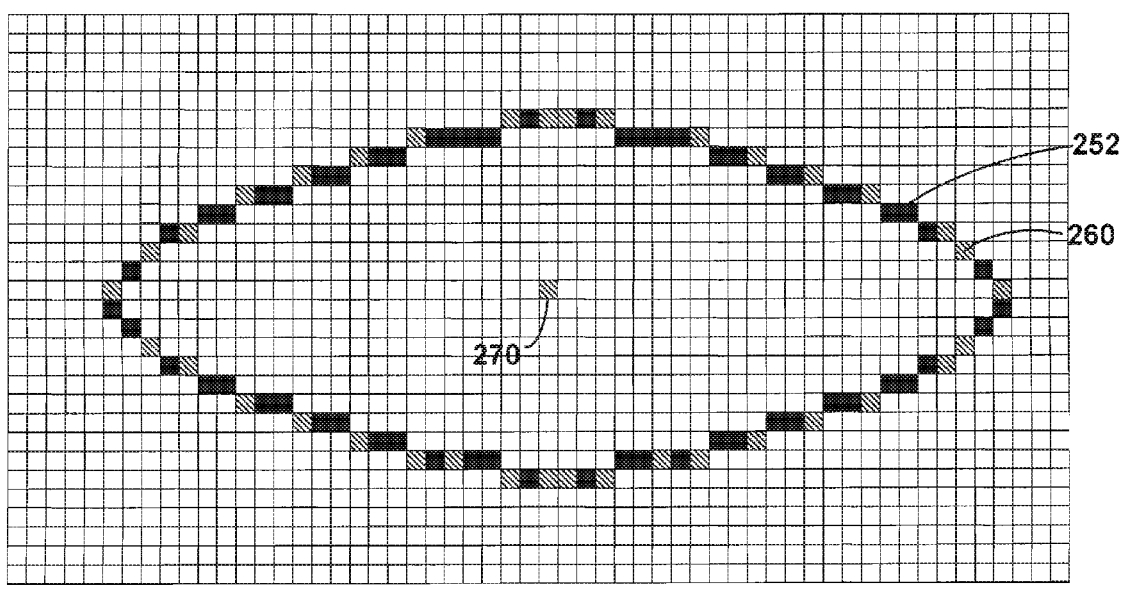
FIG. 28 shows the sample voter response area of FIG. 17 with the characteristic points of FIG. 19 centered about a fifth reference point.

FIG. 28 shows characteristic points 260 centered about the fifth current center point 270. As shown in FIG. 28, the score for the fifth current center point 270 is 36. Because the score for the fifth current center point is greater than the upper center threshold (36>32; block 171=YES in FIG. 21), the processor determines that the actual center point of the voter response area has been found at the fifth current center point 270. Preferably, the processor indicates that the actual center point has been found by setting a flag. Note that the actual center point 270 as determined by the method described above is the same as point 254 in FIGS. 17 and 25-27.

For the example shown in FIGS. 17 and 25-28, because the center point of the voter response area was found (block 138=YES in FIG. 5), the reference shape mask (shown in FIG. 6) is applied to the voter response area. Because the voter response area is blank, after the reference shape mask is applied to the voter response area, there will be zero black pixels (the reference shape mask removes the outline of the voter response area). This can be seen by reference shape mask 200 shown in FIG. 6 being overlaid on top of the voter response area 252 shows in FIG. 28 using the determined center point 270 of the voter response area as the center point of the reference shape mask 200.

Figure 29:
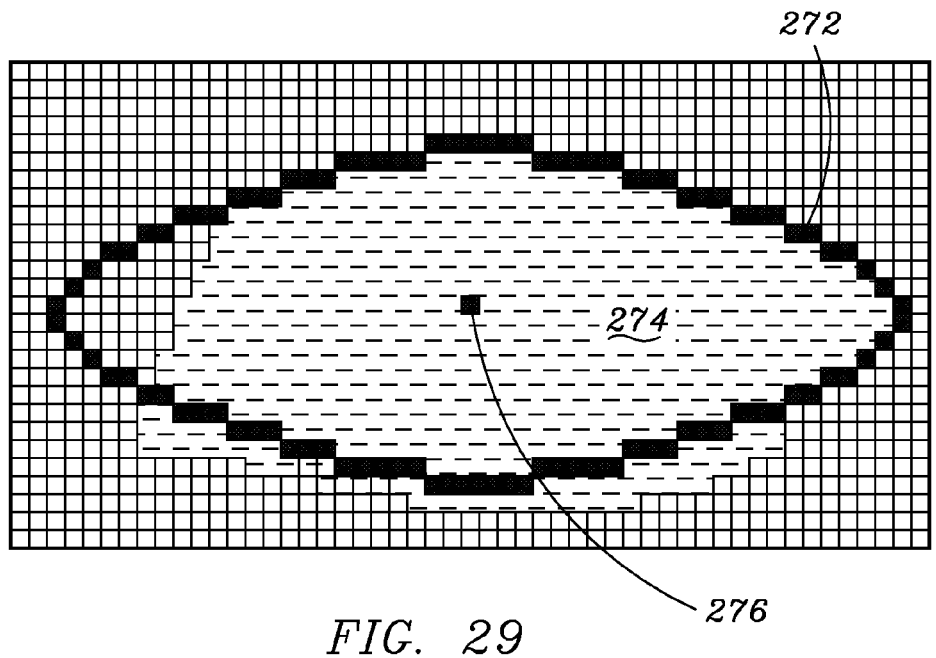
FIG. 29 shows a sample voter response area marked by a voter.
Figure 30:
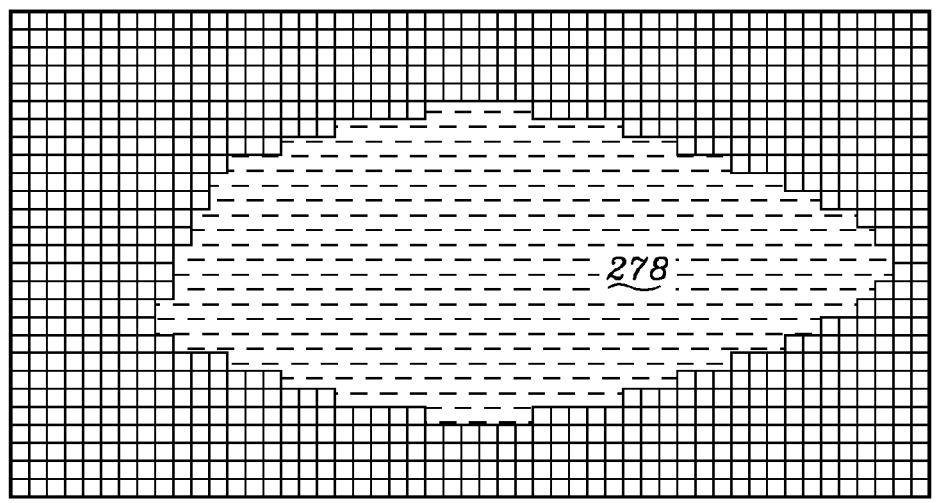
FIG. 30 shows the sample voter response area of FIG. 29 after the reference shape mask of FIG. 6 is applied.

A more instructive example of the application of reference shape mask 200 is shown in FIGS. 29 and 30. FIG. 29 shows a voter response area 272 that has been marked by a voter. Note that the mark 274 made by the voter extends outside of voter response area 272 and does not completely fill voter response area 272. We will assume that the centering process described above has already been completed and that the center point was found at point 276. Applying the reference shape mask as described above will yield the voter response area shown in FIG. 30. Note that the portion of the voter mark 274 that was outside of the voter response area 272 has been ignored. The outline of voter response area 272 has been ignored as well. Thus, as shown in FIG. 30, the only marking is the portion of voter mark 274 that was inside voter response area 272, as indicated by reference numeral 278. The mark 278 shown in FIG. 30 is then analyzed as described above to determine whether the voter response area is marked.

If none of the points had a score above the upper center threshold, and if the distance between the current center point and the initial center point is greater than the distance threshold (block 168=YES in FIG. 21), then at block 174, the processor determines if the stored score (which is the highest score) is greater than a lower center threshold. If the stored score is above the lower center threshold (block 174=YES), then, at block 176, the processor indicates that the center has been found for the voter response area and the point associated with the highest score is determined to be the actual center point. Preferably, the lower center threshold is from about 25% to about 50% of the number of characteristic points, more preferably from about 30% to about 40% of the number of characteristic points, and most preferably about 33% of the number of characteristic points. If the stored score is not greater than the lower center threshold (block 174=NO), then, at block 177, the processor indicates that the center point has not been found for the voter response area, and the initial center point is deemed to be the center point of the voter response area.

Although the use of characteristic points improves the efficiency of determining the actual center point of the voter response area, the set of characteristic points in the election definition is determined generally without respect to a specific printer or optical scanner. With a known printer and optical scanner, it is possible to use fewer characteristic points than the original set of characteristic points and maintain accuracy. When scanning ballots in the actual election, all of the characteristic points are initially used, and calibration runs after a minimum number of ballots have been scanned. Preferably, only blank voter response areas are used for calibration. During calibration, the number of black pixels in a blank voter response area are counted and stored as a shape outline count as the ballots are scanned. After a set number of voter response areas have been analyzed, a shape outline count average is calculated for the sample set. Preferably, the sample set is about 160 voter response areas, and the normal operating range for the shape outline count is from about 55 pixels to about 165 pixels. After the shape outline count average has been calculated, the characteristic points are updated to only include the number of characteristic points required based upon the average shape outline count. For example, if the shape outline count average indicates that 15 characteristic points are required, the characteristic points with the 15 largest ratios are the characteristic points used to determine the actual center point of the voter response area as described above. Calibration preferably runs after a predetermined number of ballots have been scanned, preferably about 2,000 ballots, or when the shape outline count is outside of the normal operating range.

The example described and illustrated above shows the actual center point of the voter response area within pixel level one of the initial center point. Although this example shows some benefit to using the system and method disclosed herein, the benefits of the present invention are even more apparent when there is larger distance between the initial center point and the actual center point, e.g., when the actual center point is located in pixel levels 2, 3 or 4 as shown in FIG. 22.

Figure 24A:
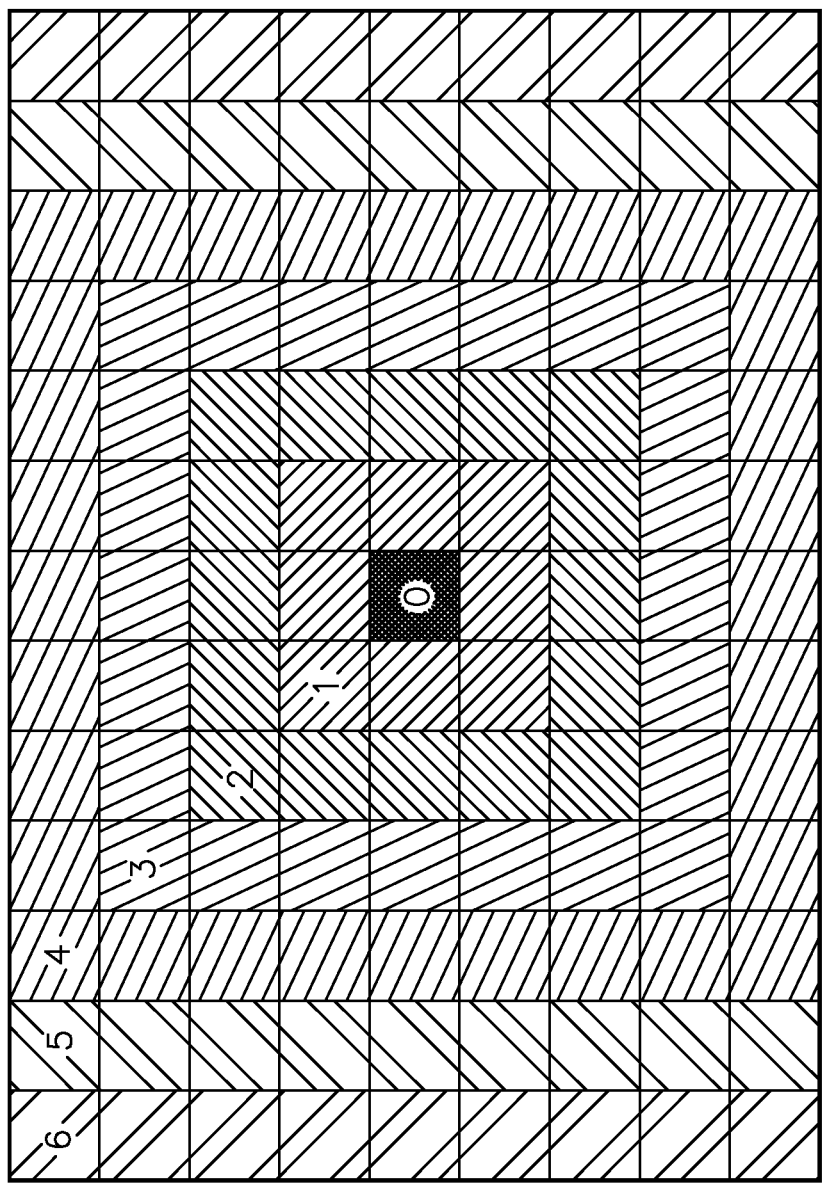
FIG. 24a shows a second example of pixel levels.
Figure 24B:
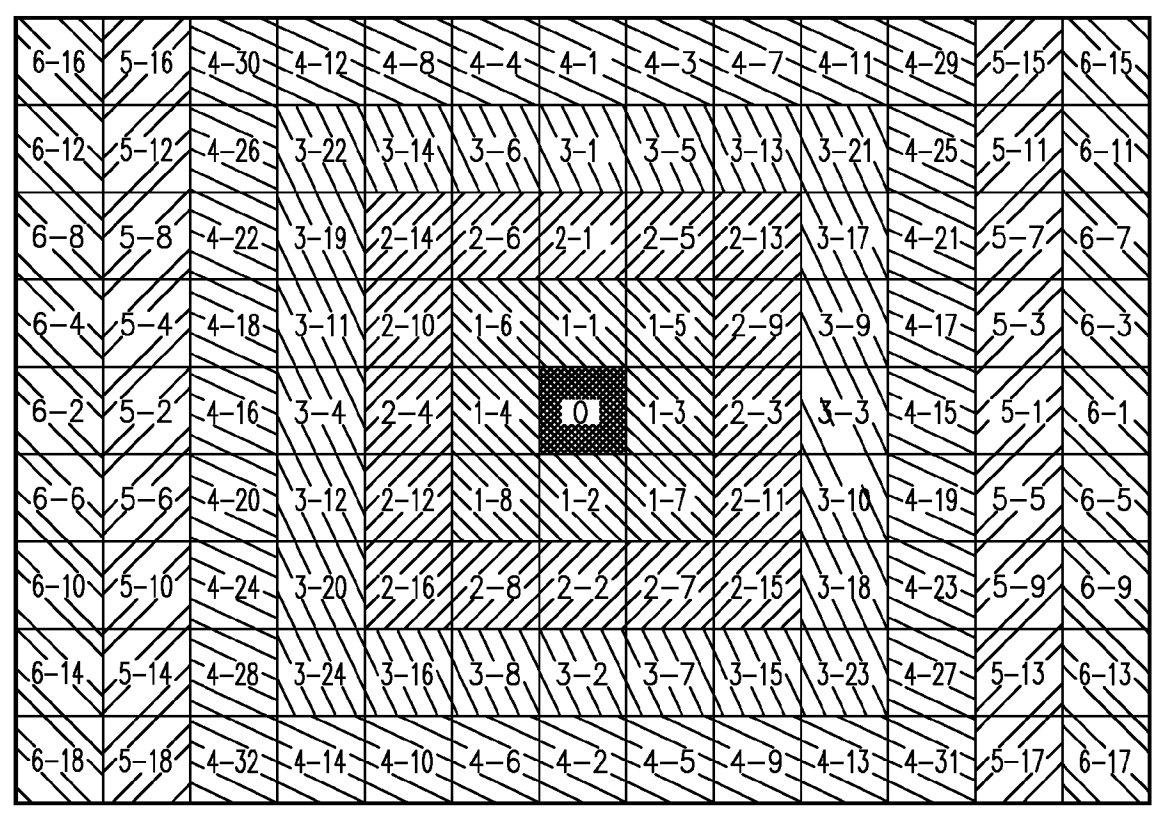

Other methods of determining the actual center point of a voter response area are possible and within the scope of the present invention. For example, instead of using pixel levels representing a concentric square "ring" as shown in FIG. 22, it is possible to use a concentric rectangular "ring" around the initial center point as shown in FIG. 24*a*, i.e., each pixel adjacent to the initial center point is level 1, each adjacent pixel outside of level 1 is level 2, each adjacent pixel outside of level 2 is level 3, and each adjacent pixel outside of level 3 is level 4. Any level that is outside the square "ring" of levels 1-4 is represented by two columns (for a rectangle laid horizontally) or two rows (for a rectangle laid vertically) equidistant from the center point. Then, instead of selecting each new point by following the spiral square pattern shown in FIG. 23, each new point would be selected using the pattern illustrated in FIG. 24*b*. As can be seen, each pixel is represented by a number in the X-Y format. X represents the pixel level of the pixel (i.e., one of pixel levels 1-6 as shown in FIG. 24*a*). Y represents the order in which the pixels are analyzed within a pixel level. For example, in pixel level 1, pixel 1-1 is analyzed first, pixel 1-2 is analyzed second, pixel 1-3 is analyzed third, and so on. In general, this pattern selects the next available pixel that is closest to the initial center point (i.e., point 0). The actual center point is then determined in accordance with blocks 168 to 177 of the process flow diagram shown in FIG. 21 (noting that the predetermined threshold in block 168 is pixel level 6).

One skilled in the art will appreciate that although the exemplary embodiment has been described above in relation to manipulation of various points or lines on the ballot image (i.e., characteristic points, center points, timing mark lines, virtual vertical and horizontal lines, etc.), the ballot tabulation device preferably only manipulates coordinates on the ballot image, not the actual image of the ballot. Additionally, although each voter response area in the exemplary embodiment has an oval shape, the present invention extends to any shape or type of voter response area known in the art.

Further, although the exemplary embodiment has been described above with reference to the center point of a voter response area, the center point is merely a reference point. One skilled in the art will recognize that any point corresponding to the voter response area could be used as a reference point, and the position could be inside or outside the voter response area. Additionally, the thresholds described herein based on a ratio or percentage of points could be replaced with a specific number threshold and vice versa.

Finally, while the present invention has been described and illustrated above with reference to an exemplary embodiment, it should be understood that various modifications could be made to this embodiment without departing from the scope of the invention. Therefore, the present invention is not to be limited to the specific configuration and methodology of the exemplary embodiment and one skilled in the art will appreciate that a number of alternative embodiments are possible and within the scope of the invention.

What is claimed and desired to be secured by Letters Patent is as follows:

1. A ballot tabulation device for analyzing one or more voter response areas on a paper ballot, comprising:
   a scanner operable to obtain an image of at least a portion of the paper ballot that includes a voter response area;
   a processor operable to analyze the image by:
      identifying an initial reference point that approximates a location of a reference point for the voter response area;
      determining the location of the reference point for the voter response area using the initial reference point and a virtual template applied to the image;
      using the reference point for the voter response area to define a response window; and
      analyzing the response window to determine if the voter response area is marked by a voter.

2. The ballot tabulation device of claim 1, wherein the reference point for the voter response area comprises a center point of the voter response area.

3. The ballot tabulation device of claim 2, wherein the response window comprises a rectangular window that is centered on the center point of the voter response area.

4. The ballot tabulation device of claim 1, wherein the voter response area includes a printed outline that defines an outer boundary of the voter response area.

5. The ballot tabulation device of claim 4, wherein the printed outline of the voter response area has an oval shape.

6. The ballot tabulation device of claim 4, wherein the virtual template comprises a set of characteristic points positioned in predetermined locations in relation to the reference point of the voter response area.

7. The ballot tabulation device of claim 6, wherein at least some of the characteristic points are located on the printed outline of the voter response area.

8. The ballot tabulation device of claim 1, wherein the paper ballot includes a left timing mark, a right timing mark, a top timing mark and a bottom timing mark associated with the voter response area, and wherein the initial reference point is identified by locating an intersection of a first virtual line connected between the left and right timing marks and a second virtual line connected between the top and bottom timing marks.

9. The ballot tabulation device of claim 1, wherein the virtual template comprises a set of characteristic points positioned in predetermined locations in relation to the reference point of the voter response area.

10. The ballot tabulation device of claim 9, wherein the processor is operable to overlay the characteristic points on the image in a position determined by the initial reference point and calculate a score corresponding to a number of the characteristic points that match corresponding points on the image.

11. The ballot tabulation device of claim 10, wherein the processor determines that the reference point is the initial reference point if the score associated with the initial reference point is above an upper threshold value.

12. The ballot tabulation device of claim 11, wherein the score associated with the initial reference point is below the upper threshold value, and wherein the processor is operable to:
   identify one or more adjusted reference points located one or more distances from the initial reference point; and
   for each of the adjusted reference points, overlay the characteristic points on the image in a position determined by the adjusted reference point and calculate a score corresponding to a number of the characteristic points that match corresponding points on the image.

13. The ballot tabulation device of claim 12, wherein the processor determines that the reference point is the one of the adjusted reference points associated with a score above the upper threshold value.

14. The ballot tabulation device of claim 12, wherein the score associated with each of the adjusted reference points is below the upper threshold value, and wherein the processor is operable to identify the initial reference point or the one of the adjusted reference points associated with the highest score.

15. The ballot tabulation device of claim 14, wherein the processor determines that the reference point is the initial reference point or the one of the adjusted reference points associated with the highest score if the highest score is above a lower threshold value.

16. The ballot tabulation device of claim 1, wherein the processor is operable to apply a virtual mask to the image to mask all points outside of the voter response area.

17. The ballot tabulation device of claim 16, wherein the voter response area includes a printed outline that defines an outer boundary of the voter response area, and wherein the virtual mask also masks the printed outline.

18. The ballot tabulation device of claim 1, wherein the virtual template comprises a set of characteristic points positioned in predetermined locations in relation to the reference point of the voter response area.

19. The ballot tabulation device of claim 18, wherein the characteristic points comprise points that are common to a plurality of sample images of a plurality of sample paper ballots.

20. The ballot tabulation device of claim 19, wherein the sample paper ballots are printed on a plurality of printers.

21. The ballot tabulation device of claim 19, wherein the sample paper ballots are scanned on a plurality of tabulation devices to obtain the sample images.

22. A system for analyzing one or more voter response areas on a paper ballot, comprising:
   a scanner operable to obtain an image of at least a portion of the paper ballot that includes a voter response area, wherein the voter response area includes a printed outline that defines an outer boundary of the voter response area;
   a processor operable to analyze the image by:
      identifying an initial center point that approximates a location of a center point for the voter response area;
      determining the location of the center point for the voter response area using the initial center point and a virtual template, wherein the virtual template comprises a set of characteristic points positioned in predetermined locations in relation to the center point of the voter response area;

defining a response window that is centered on the center point of the voter response area; and analyzing the response window to determine if the voter response area is marked by a voter.

23. The system of claim 22, wherein at least some of the characteristic points are located on the printed outline of the voter response area.

24. The system of claim 22, wherein the paper ballot includes a left timing mark, a right timing mark, a top timing mark and a bottom timing mark associated with the voter response area, and wherein the initial center point is identified by locating an intersection of a first virtual line connected between the left and right timing marks and a second virtual line connected between the top and bottom timing marks.

25. The system of claim 22, wherein the processor is operable to apply a virtual mask to the image to mask the printed outline and all points outside of the voter response area.

26. The system of claim 22, wherein the characteristic points comprise points that are common to a plurality of sample images of a plurality of sample paper ballots.

27. The system of claim 26, wherein the sample paper ballots are printed on a plurality of printers.

28. The system of claim 26, wherein the sample paper ballots are scanned on a plurality of tabulation devices to obtain the sample images.

29. A system for analyzing one or more response areas on a response sheet, comprising:

a scanner operable to obtain an image of at least a portion of the response sheet that includes a response area;

a processor operable to analyze the image by:

identifying an initial reference point that approximates a location of a reference point for the response area;

determining the location of the reference point for the response area using the initial reference point and a virtual template, wherein the virtual template comprises a set of characteristic points positioned in predetermined locations in relation to the reference point of the response area;

using the reference point for the response area to define a response window; and analyzing the response window to determine if the response area is marked.

30. The system of claim 29, wherein the reference point for the response area comprises a center point of the response area.

31. The system of claim 30, wherein the response window comprises a rectangular window that is centered on the center point of the response area.

32. The system of claim 29, wherein the response area includes a printed outline that defines an outer boundary of the response area.

33. The system of claim 32, wherein the printed outline of the response area has an oval shape.

34. The system of claim 32, wherein at least some of the characteristic points are located on the printed outline of the response area.

35. The system of claim 29, wherein the response sheet includes a left timing mark, a right timing mark, a top timing mark and a bottom timing mark associated with the response area, and wherein the initial reference point is identified by locating an intersection of a first virtual line connected between the left and right timing marks and a second virtual line connected between the top and bottom timing marks.

36. The system of claim 29, wherein the processor is operable to overlay the characteristic points on the image in a position determined by the initial reference point and calculate a score corresponding to a number of the characteristic points that match corresponding points on the image.

37. The system of claim 36, wherein the processor determines that the reference point is the initial reference point if the score associated with the initial reference point is above an upper threshold value.

38. The system of claim 37, wherein the score associated with the initial reference point is below the upper threshold value, and wherein the processor is operable to:

identify one or more adjusted reference points located one or more distances from the initial reference point; and for each of the adjusted reference points, overlay the characteristic points on the image in a position determined by the adjusted reference point and calculate a score corresponding to a number of the characteristic points that match corresponding points on the image.

39. The system of claim 38, wherein the processor determines that the reference point is the one of the adjusted reference points associated with a score above the upper threshold value.

40. The system of claim 38, wherein the score associated with each of the adjusted reference points is below the upper threshold value, and wherein the processor is operable to identify the initial reference point or the one of the adjusted reference points associated with the highest score.

41. The system of claim 40, wherein the processor determines that the reference point is the initial reference point or the one of the adjusted reference points associated with the highest score if the highest score is above a lower threshold value.

42. The system of claim 29, wherein the processor is operable to apply a virtual mask to the image to mask all points outside of the response area.

43. The system of claim 42, wherein the response area includes a printed outline that defines an outer boundary of the response area, and wherein the virtual mask also masks the printed outline.

44. The system of claim 29, wherein the characteristic points comprise points that are common to a plurality of sample images of a plurality of response sheets.

45. The system of claim 44, wherein the sample response sheets are printed on a plurality of printers.

46. The system of claim 44, wherein the sample response sheets are scanned on a plurality of optical scanners to obtain the sample images.

* * * * *

UNITED STATES PATENT AND TRADEMARK OFFICE
CERTIFICATE OF CORRECTION

PATENT NO. : 8,840,022 B1  
APPLICATION NO. : 13/965368  
DATED : September 23, 2014  
INVENTOR(S) : Bruno Roger, Mike Dvorak and Santhoush Monappa Shetty Page 1 of 1

It is certified that error appears in the above-identified patent and that said Letters Patent is hereby corrected as shown below:

Title page, item (72), Inventor, delete "Bruno Roger, Omaha, NE (US); Mike Dvorak, Plattsmouth, NE (US)" and insert -- Bruno Roger, Omaha, NE (US); Mike Dvorak, Plattsmouth, NE (US); Santhoush Monappa Shetty, Omaha, NE (US) -- therefor.

Signed and Sealed this  
Seventh Day of July, 2015

Michelle K. Lee  
*Director of the United States Patent and Trademark Office*